United States Patent
Clark et al.

(10) Patent No.: US 9,175,799 B2
(45) Date of Patent: Nov. 3, 2015

(54) SYSTEM AND METHOD FOR MODULAR REPAIR OF PIPE LEAKS

(75) Inventors: John W. Clark, Houston, TX (US); Jerry Robb, La Porte, TX (US)

(73) Assignee: Colt Services, LP, La Porte, TX (US)

( * ) Notice: Subject to any disclaimer, the term of this patent is extended or adjusted under 35 U.S.C. 154(b) by 572 days.

(21) Appl. No.: 13/448,109

(22) Filed: Apr. 16, 2012

(65) Prior Publication Data

US 2012/0199234 A1    Aug. 9, 2012

Related U.S. Application Data

(63) Continuation-in-part of application No. 12/829,268, filed on Jul. 1, 2010, now Pat. No. 8,210,210.

(60) Provisional application No. 61/222,459, filed on Jul. 1, 2009.

(51) Int. Cl.
 F16L 55/16    (2006.01)
 F16L 55/179   (2006.01)
 F16L 55/172   (2006.01)

(52) U.S. Cl.
 CPC ............. *F16L 55/179* (2013.01); *F16L 55/172* (2013.01)

(58) Field of Classification Search
 USPC ..................................................... 138/99, 97
 See application file for complete search history.

(56) References Cited

U.S. PATENT DOCUMENTS

| | | |
|---|---|---|
| 12,708 A | 4/1855 | Stone |
| 631,867 A | 8/1899 | Beaver |
| 732,400 A | 6/1903 | Dresser et al. |
| 3,396,753 A | 8/1968 | Foster et al. |
| 3,517,701 A | 6/1970 | Smith |
| 3,861,422 A | 1/1975 | Christie |
| 3,944,260 A | 3/1976 | Petroczky |
| 3,954,288 A | 5/1976 | Smith |
| 4,049,296 A | 9/1977 | Harrison |
| 4,133,351 A | 1/1979 | Harrison et al. |
| 4,171,142 A | 10/1979 | Harrison |
| 4,209,029 A | 6/1980 | Pennington |
| 4,544,188 A | 10/1985 | Dugger |
| 4,568,091 A | 2/1986 | Harrison |
| 4,576,401 A | 3/1986 | Harrison |

(Continued)

OTHER PUBLICATIONS

Team, Inc., Pipe Repairs, Inc., "Insert-A-Size Enclosures, Clamps," (excerpt from company binder), 1997, 8 pages (not numbered).

(Continued)

*Primary Examiner* — Patrick F Brinson
(74) *Attorney, Agent, or Firm* — Chowdhury Law Group, P.C.

(57) ABSTRACT

A modular pipe repair enclosure system includes first and second enclosure portions, and an enclosure attachment device. The first and second enclosure portions create an enclosure around the pipe for covering leaks. The enclosure has three openings for accommodating the pipe. The first and second openings are arranged at an angle of 180 degrees with respect to each other, and at an angle of 90 degrees with respect to the third opening, such that a straight line section of pipe may be accommodated by the first and second openings, an elbow section of pipe by the first and third openings, and a T-section of pipe by the first, second, and third openings. The system may further include a blank, for closing one of the openings, for use with a straight or elbow section, and a sleeve, for reducing the inner diameter of an opening, for accommodating pipes of different diameters.

22 Claims, 22 Drawing Sheets

(56) References Cited

U.S. PATENT DOCUMENTS

| | | |
|---|---|---|
| 4,580,788 A | 4/1986 | Rabe et al. |
| 4,709,729 A | 12/1987 | Harrison |
| 4,721,330 A | 1/1988 | Woodhouse |
| 4,768,813 A | 9/1988 | Timmons |
| 4,790,058 A | 12/1988 | Miller |
| 4,895,397 A | 1/1990 | Miller |
| 5,066,053 A | 11/1991 | Miller |
| 5,118,139 A | 6/1992 | Lott |
| 5,853,030 A | 12/1998 | Walding |
| 5,899,507 A | 5/1999 | Schroeder et al. |
| 5,918,639 A | 7/1999 | Ottestad et al. |
| 5,950,683 A | 9/1999 | Henderson et al. |
| 6,131,597 A | 10/2000 | Mendicino et al. |
| 6,220,302 B1 | 4/2001 | Nolley |
| 6,237,640 B1 | 5/2001 | Vanderlee |
| 6,305,719 B1 | 10/2001 | Smith, Jr. et al. |
| 6,685,238 B1 | 2/2004 | Pouillard |
| 6,990,718 B2 | 1/2006 | Gregory |
| 7,617,843 B1 | 11/2009 | Al-Oriar |
| 7,900,655 B2 | 3/2011 | Morton et al. |

OTHER PUBLICATIONS

Team, Inc., "Adjustable Bar Clamp," (excerpt from company binder), 1995, 2 pages (not numbered).

Team Environmental Services, Inc., "Team Environmental Services Inc., A Team Inc. Company," (excerpt from company brochure), 1996, pp. 1, 2, 16 and 17.

US 9,175,799 B2

SYSTEM AND METHOD FOR MODULAR REPAIR OF PIPE LEAKS

CROSS REFERENCE TO RELATED APPLICATIONS

This application claims the benefit of the filing date of U.S. patent application Ser. No. 12/829,268, incorporated herein by reference, which was filed on Jul. 1, 2010, by the same inventors of this application, and which claims the benefit of the filing date of U.S. provisional patent application No. 61/222,459, incorporated herein by reference, which was filed on Jul. 1, 2009, by the same inventors of this application.

TECHNICAL FIELD OF THE PRESENT DISCLOSURE

The present disclosure relates generally to repair and sealing of pipe leaks. More particularly, the present disclosure relates to modular repair and sealing of leaks in pipelines under pressure.

BACKGROUND OF THE PRESENT DISCLOSURE

Leaks often develop in pipelines along pipe and pipe fitting connections. Environmental factors as well as age and use of the pipe result in deterioration and leaks along the pipe. Problems with thread or weld leaks on screwed or socket-weld connections, at coupling elbows, and unions of the pipeline requiring repair may result in shutdown of the pipeline. After the repair is completed, new leaks along the pipe may occur requiring shutdown and further repair.

Halting the flow of product through the high pressure pipeline for repair of the pipe results in delayed delivery and lost revenue for the pipeline operator. Repairing the pipe as it carries product without shutting down the pipeline eliminates lost revenue and interruptions in product delivery.

SUMMARY OF THE PREFERRED EMBODIMENTS

One or more of the problems outlined above may be solved by the various embodiments of the invention. Broadly speaking, the invention includes systems and methods for repair and sealing of leaks in pipelines under pressure. In one aspect, disclosed is a method for modular pipe repair, comprising: attaching two enclosure halves over a leak in a pipe to assemble a first repair enclosure; attaching enclosure attachment devices to the assembled repair enclosure, wherein each of the enclosure attachment devices is fastener such as a clamping bolt or clamping stud; determining if another repair enclosure is needed for another leak in the pipe, wherein if another repair enclosure is needed: drilling in the first repair enclosure a drill hole passage in each of selected ones of a plurality of angled grooves to connect to a primary groove in the enclosure; attaching a second repair enclosure to pipe; attaching enclosure attachment devices to the assembled second repair enclosure, wherein each of the enclosure attachment devices is fastener such as a clamping bolt or clamping stud; drilling in the second repair enclosure a drill hole passage in each of selected ones of a plurality of angled grooves to connect to the primary groove in the second enclosure; and attaching hub clamps to the first repair enclosure and the second repair enclosure; and if another repair enclosure is not needed: determining if a strongback rod is needed; wherein if a strongback rod is needed: attaching a strongback clamping device to the pipe and the repair enclosure; and attaching a strongback rod to the strongback clamping device; and injecting sealant into a plurality of injection points to fill the selected angled grooves and the primary grooves in the repair enclosure(s), wherein the sealant is a Teflon™ fiber sealant.

In another aspect, a modular pipe repair enclosure comprises: a plurality of enclosure halves, each enclosure half including angled grooves and a primary groove and being made of a solid steel piece; and a plurality of clamping devices, which may include hub clamps, each of which attaches to two enclosure halves, and/or strongback clamping devices, which may be fitted with strongback rods; wherein the enclosure halves and clamping devices are attached to repair one or more leaks in a pipe.

In a third aspect, a modular pipe repair enclosure system may include a first enclosure portion, a second enclosure portion, and an enclosure attachment device, for securing or attaching the first enclosure portion and the second enclosure portion. The first enclosure portion and the second enclosure portion may be so configured as to be disposable around a pipe so as to create an enclosure around the pipe and a void portion, the void portion constituting a void between the enclosure and the pipe and being for covering one or more leaks in the pipe, and the enclosure including three openings, each of the three openings being configured to accommodate the enclosed pipe. Of the three openings, a first opening and a second opening may be arranged at an angle of 180 degrees with respect to each other, and a first opening and a third opening may be arranged at an angle of 90 degrees with respect to each other, whereby a straight line section of pipe may be accommodated by the first and second openings, an elbow section of pipe may be accommodated by the first and third openings, and a T-section of pipe may be accommodated by the first, second, and third openings. The first and second enclosure portions may collectively include at least one injection point, configured for communication with the void portion and for injecting sealant through the injection point into the void portion. The modular pipe repair enclosure system may further include a sleeve, configured for connection to the first enclosure portion and/or the second enclosure portion and for accommodating the enclosed pipe when connected to the first enclosure portion and/or the second enclosure portion, a blank, configured for connection to the first enclosure portion and/or the second enclosure portion and for closing one of the openings when connected to the first enclosure portion and/or the second enclosure portion, and/or a strongback clamping unit, the strongback clamping unit being disposable around the pipe, being configured for connection to the first enclosure portion and/or the second enclosure portion, and having a strongback holder configured for holding a strongback rod for enhancing structural integrity of the pipe.

In a fourth aspect, a method for modular pipe repair, using the system of the third aspect, may comprise disposing a first enclosure portion around a pipe; disposing a second enclosure portion around the pipe, so as to create an enclosure around the pipe and a void portion, the void portion constituting a void between the enclosure and the pipe, and the enclosure including three openings each configured to accommodate the enclosed pipe; securing or attaching the first and second enclosure portions, using an enclosure attachment device; and injecting sealant through an injection point of the first and second enclosure portions into the void portion, wherein the void portion covers a leak in the pipe. The method may further comprise connecting a sleeve to at least one of the first and second enclosure portions, whereby the connected sleeve accommodates the enclosed pipe; connecting a blank to at least one of the first and second enclosure portions, whereby the blank closes one of the openings of the created enclosure; and/or installing a strongback clamping unit, having a strongback rod, on the first and second enclosure portions, including securing the strongback clamping unit, using a securing device. The method may be used to repair one or more leaks in a straight section, elbow section, or T-section of pipe.

In a fifth aspect, individual components of the modular pipe repair enclosures described above may be manufactured each from a single solid steel piece, using computer-aided design and manufacture.

Numerous additional embodiments are also possible.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "attached" is intended to mean either an indirect or direct physical connection. Thus, if a first device attaches to a second device, that connection may be through a direct physical connection, or through an indirect physical connection via other devices and connections. In addition, the term "connect" and grammatical variants thereof are used as follows. If item x is said to be connectable to item y, it is intended that item y is also connectable to item x; the expression "item x is connectable to item y" is used interchangeably with the expression "item y is connectable to item x," and both of these expressions are used interchangeably with the expression "items x and y are interconnectable." Further, the prepositions "to" and "with" are used interchangeably with the term "connect" and grammatical variants thereof. For the sake of convenience and clarity, additional terminological information is provided below at pertinent points in the following description.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation specific decisions must be made to achieve the developers' specific goals, such as compliance with system related and business related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
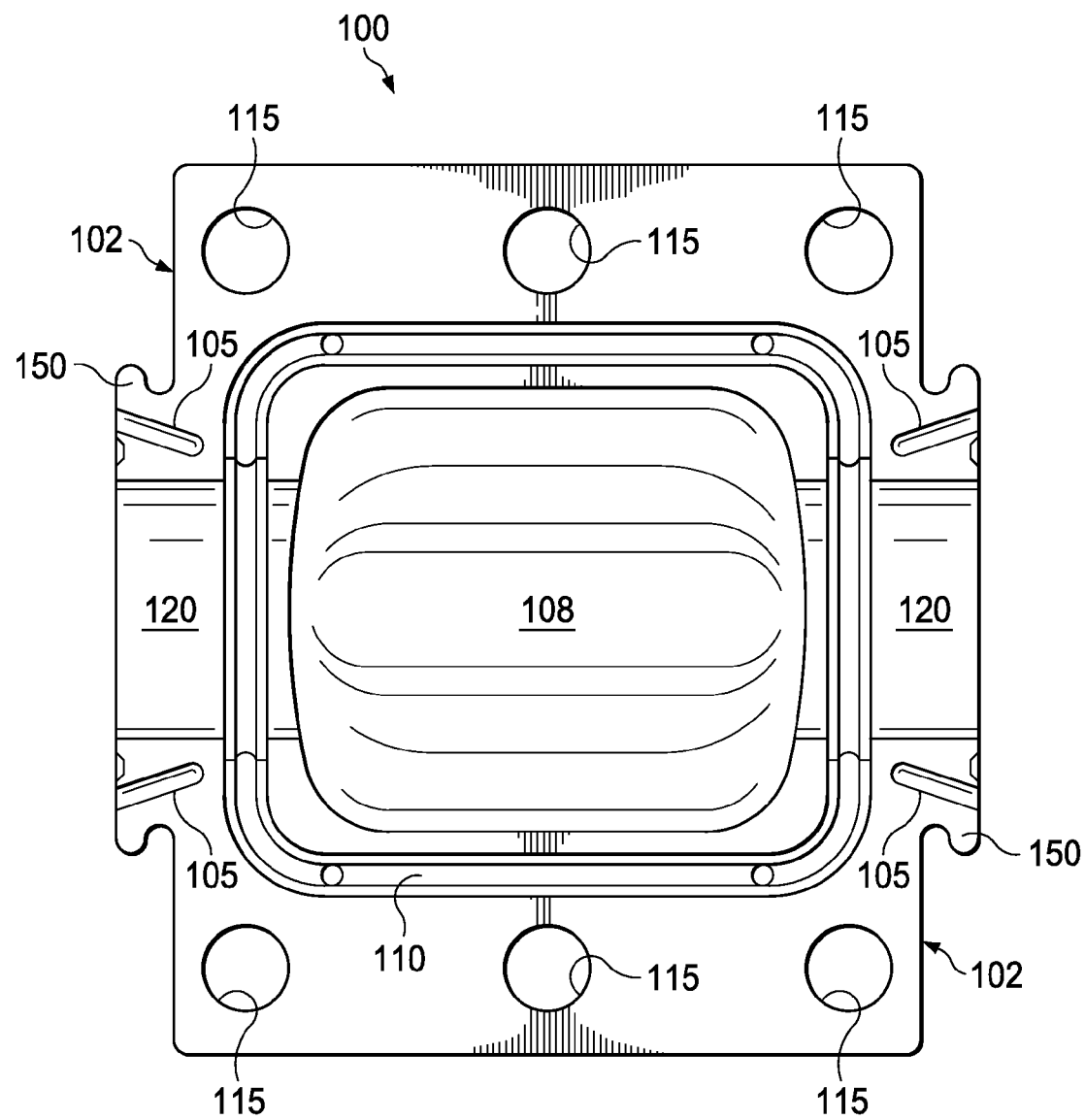
FIG. 1, in accordance with some embodiments of the present disclosure, shows half of an enclosure (an enclosure half) including angled grooves.
Figure 8:
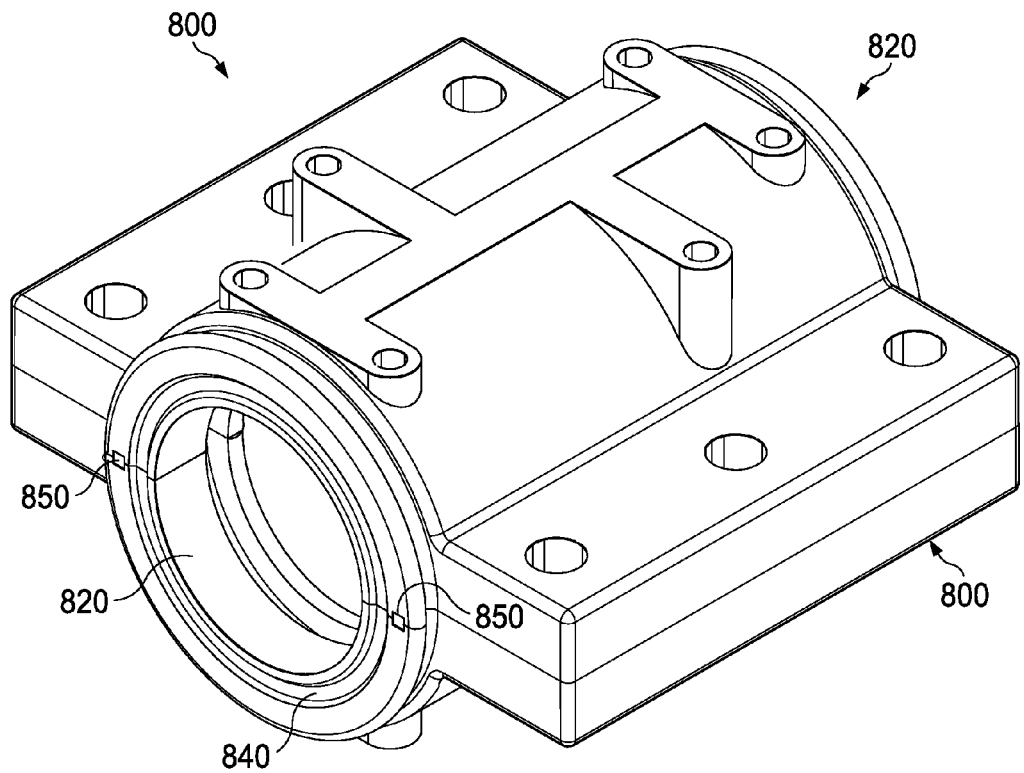
FIG. 8, in accordance with some embodiments of the present disclosure, shows an assembled modular repair enclosure including two enclosure halves joined together.

Turning now to FIG. 1, in accordance with some embodiments of the present disclosure, there is shown an enclosure half 100 (which may also be referred to as half of an enclosure) including angled grooves 105, located in axially opposite end portions called hubs 102. It is noted that the two axially opposite end portions or hubs 102 of enclosure half 100 may collectively be referred to as a single (combined) end portion. Each axially opposite end portion or hub 102 may include an outer lip 150, which will be described further below. As will become understood in view of the subsequent portions of the disclosure hereinbelow, enclosure half 100 may be disposed around a pipe, e.g. axially along and partially circumferentially, e.g. semi-circumferentially, around a pipe, and a pair of opposing enclosure halves 100 may be disposed circumferentially around a pipe to form an enclosure (an example of which is shown in FIG. 8); in this situation the axially opposite end portions or hubs 102 of one of the opposing enclosure halves 100 align, respectively, with the axially opposite end portions or hubs 102 of the other one of the opposing enclosure halves 100. As will be described in more detail with reference to FIG. 12, the enclosure halves 100 may be machined from a solid steel metal piece that in accordance with some embodiments of the invention may be 516-grade 70 steel. The enclosure half 100 may include a void section 108 and a primary groove 110 along the perimeter of the enclosure half 100 extending around the void section 108. As will be understood in view of the subsequent portions of the disclosure hereinbelow, when enclosure half 100 is placed around a pipe, void section 108 constitutes a void between enclosure half 100 and the pipe. The enclosure half 100 may also include clamping holes 115 for fasteners such as clamping bolts (not shown in FIG. 1) and a pipe retainer section 120. In accordance with some embodiments of the present disclosure, the pipe retainer section 120 supports the pipe (not shown in FIG. 1) and the leaking section of pipe may be covered by the void section 108 of the enclosure half 100. As understood from the above discussion, a second enclosure half (not shown in FIG. 1) of identical construction to the first enclosure half 100 is placed over the first enclosure half 100 around the pipe to form an enclosure. The clamping holes 115 are aligned and fasteners such as clamping bolts and nuts (not shown in FIG. 1) are attached to complete the modular repair enclosure.

The following discussion of terminology and usage applies to the immediately preceding description and throughout the entirety of this document. The expressions "disposed around a pipe," "placed around a pipe," or the like, or grammatical variants thereof, when not further qualified, may refer to the notion of being positioned partly (circumferentially) around a pipe and/or to the notion of being positioned completely (circumferentially) around a pipe. In some cases, context will make clear which of such notions is being referred to, e.g. enclosure half 100, illustrated in FIG. 1, by virtue of its shape, may be positioned partly around a pipe, but not completely around a pipe, whereas two opposed enclosure halves 100, by virtue of their shape in such combination, may be positioned completely around a pipe but not partly around a pipe. Here, it is assumed that the pipe under discussion is one whose outer circumference fits the inner circumference of the opposed enclosure halves (for the case of the embodiments illustrated in FIGS. 1-13) or of the opposed enclosure portions, with or without sleeves, as appropriate (for the case of the embodiments illustrated in FIGS. 14A-23). Relatedly, the above expressions may refer to being positioned partly/completely around a portion of a pipe, i.e. a segment of a pipe having an axial extension or length less than that of the entire pipe, it being understood, e.g., that for the technological applications discussed herein a modular repair enclosure will often be shorter (i.e. of lesser axial extension or length) than the pipe upon which it is placed to effect repair thereof. (An example of such an axially extended portion of a pipe is shown in FIG. 5.) In this regard, still further relatedly, the expressions "disposed along a pipe," "placed along a pipe," or the like, or grammatical variants thereof, when not further qualified, may refer to the notion of being positioned lengthwise along a portion or segment of a pipe, the portion or segment being of lesser axial extent or length than the entire pipe. Thus, the word "pipe," "portion of pipe," "section of pipe" or the like may be used interchangeably in this application.

Figure 2:
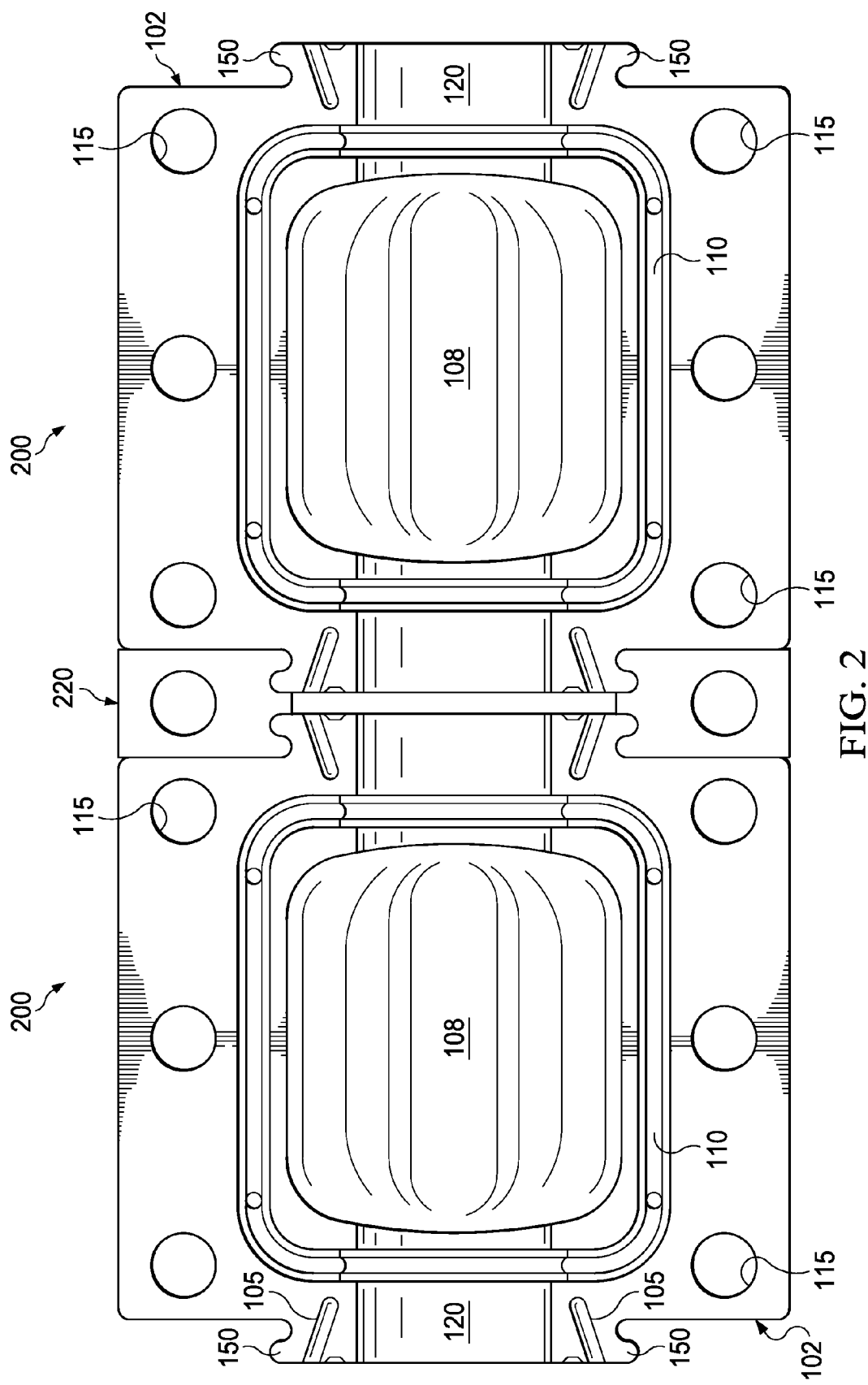
FIG. 2, in accordance with some embodiments of the present disclosure, shows two enclosure halves attached by a hub clamp.

Referring to FIG. 2, two enclosure halves 200 attached by a hub clamp 220, in accordance with some embodiments of the present disclosure, are shown. Each enclosure half 200 may be identical as shown in FIG. 2 and includes a void section 108, pipe retainer sections 120, two axially opposite end portions or hubs 102, outer lips 150, primary groove 110, angled grooves 105, and clamping holes 115. It is noted that the two axially opposite end portions or hubs 102 of enclosure half 200 may collectively be referred to as a single (combined) end portion. The hub clamp 220 connects the two identical enclosure halves 200 shown in FIG. 2 together. Hub clamp 220 may be disposed around a pipe, e.g. axially along and partially circumferentially, e.g. semi-circumferentially, around a pipe. A pair of opposing hub clamps 220 may be disposed circumferentially around a pipe (this may be more easily understood e.g. from FIG. 5).

Figure 3:
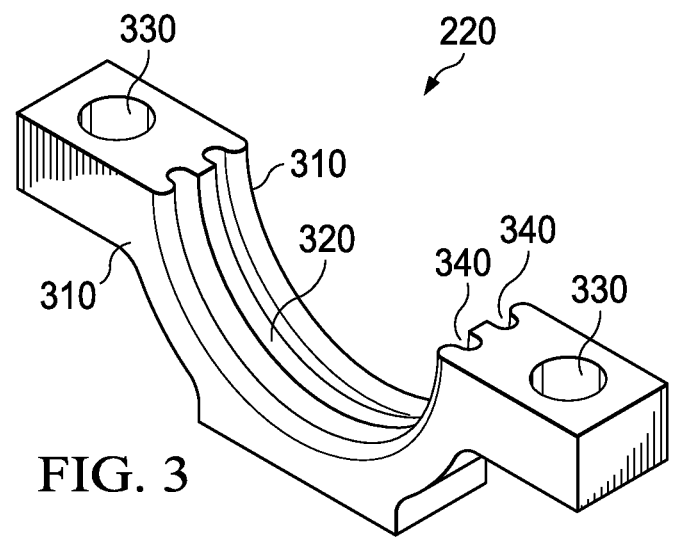
FIG. 3, in accordance with some embodiments of the present disclosure, shows a more detailed view of the hub clamp of FIG. 2.

FIG. 3 shows a more detailed view of the hub clamp 220. As shown in FIG. 3, the hub clamp 220 includes two axially opposite side portions or hubs 310, which are located at axially opposite sides of hub clamp 220 when hub clamp 220 is disposed around a pipe, e.g. partially circumferentially, e.g., semi-circumferentially, around a pipe. Each side portion or hub 310 may include an inner lip 340. In between the two inner lips 340, there is a sealant groove 320. Inner lips 340 and sealant groove 320 are all parallel to one another and run the half-circle length of the semi-circular portion of hub clamp 220. At each end of the hub clamp 220, clamping holes 330 are present that align with the clamping holes 115 of the enclosure halves 200 as shown in FIG. 2. As will become even clearer hereinbelow, each inner lip 340 is matingly connectable to outer lip 150 of enclosure half 200, such that a given enclosure half 200, at either of its two axially opposite end portions or hubs 102, may be matingly connected to a given hub clamp 220, at either of its two side portions or hubs 310. It is noted that, in so connecting a hub clamp 220 to an enclosure half 200 that is disposed around a pipe, the hub clamp 220 is also being disposed around the pipe. It is further noted that, in such mating connection, when an enclosure half 200 and a hub clamp 220 are disposed around a pipe, outer lip 150 of enclosure half 200 is disposed to lie at a radially interior position while inner lip 340 of hub clamp 220 is disposed to lie at a radially exterior position (in other words, outer lip 150 will lie radially between the pipe and inner lip 340). Accordingly, a pair of opposing hub clamps 220 can be matingly connected to one or two pairs of opposing enclosure halves 100 or 200 while the pair(s) of opposing enclosure halves is(are) disposed circumferentially around the pipe. Thus, additional hub clamps and enclosure halves can be connected to pre-existing modular repair enclosures (i.e. enclosure halves or concatenations of enclosure half-hub clamp-enclosure half already attached to the pipe). In this way, modular extensions to the pipe repair system can be made at times later than the installation of initial modular repair enclosures.

Figure 4:
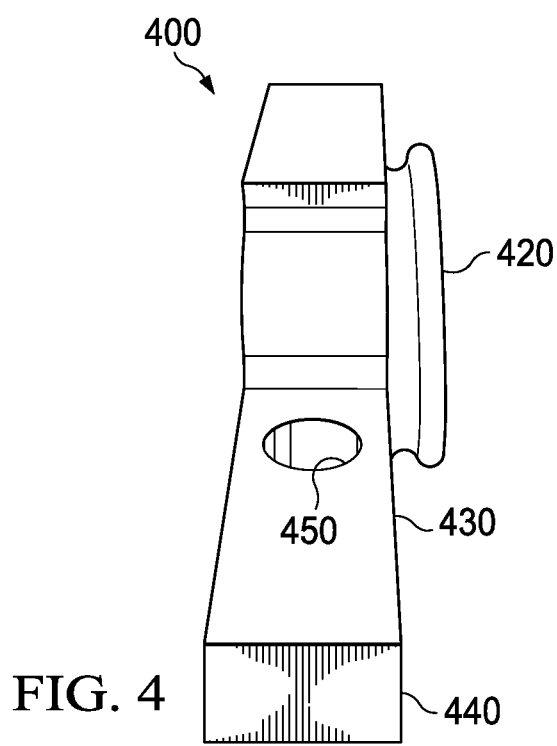
FIG. 4, in accordance with some embodiments of the present disclosure, shows a back view of a strongback clamping device of FIG. 7.
Figure 5:
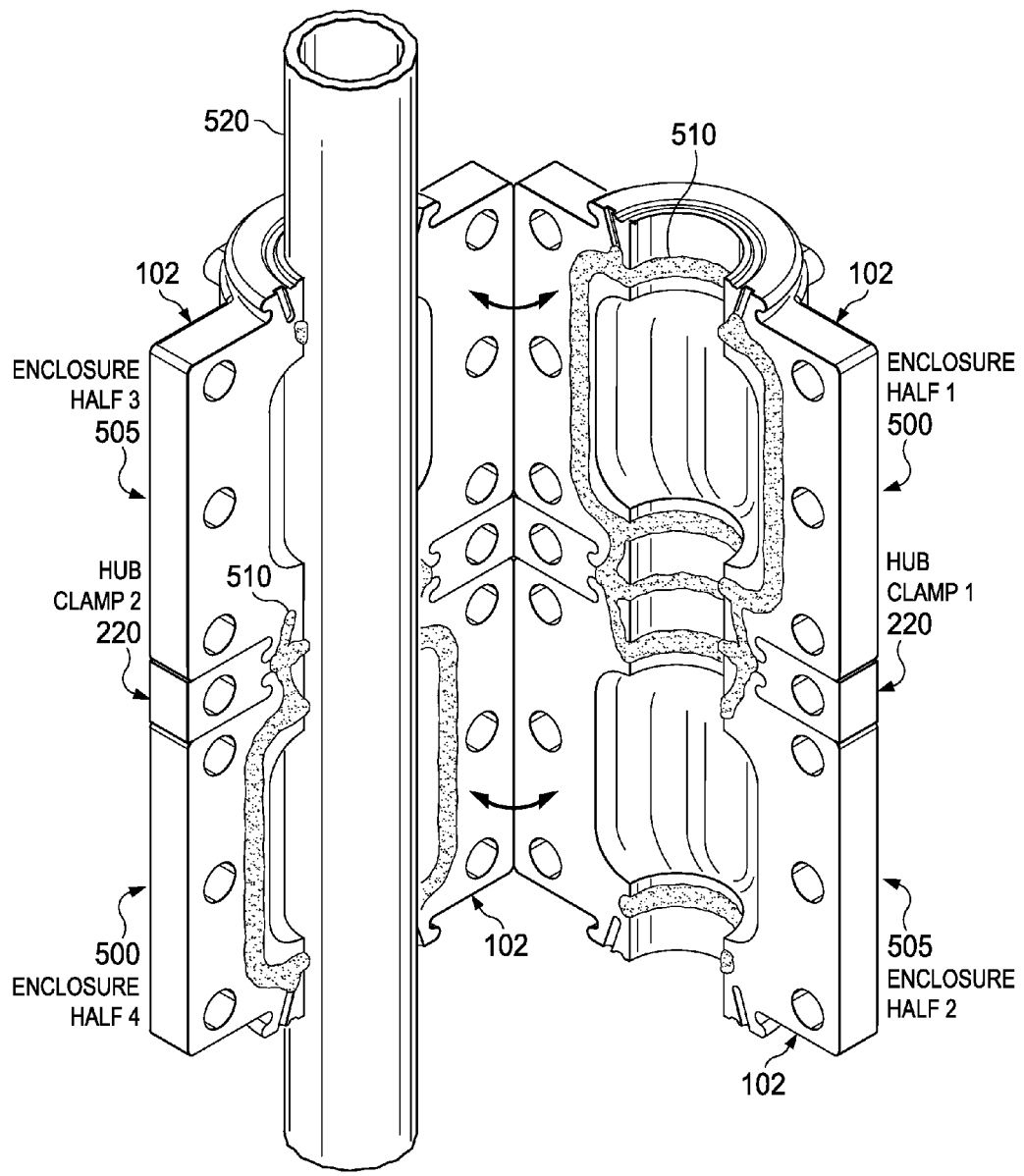
FIG. 5, in accordance with some embodiments of the present disclosure, shows an unassembled modular repair enclosure including two sets of components, each set having two enclosure halves attached by a hub clamp therebetween, the repair enclosure including sealant along grooves and containing a pipe.

In accordance with some embodiments of the present disclosure, FIG. 4 shows a strongback clamping device 400 as also described in more detail below with reference to FIGS. 7 and 13. Strongback clamping device 400 may be disposed around a pipe, e.g. axially along and partially circumferentially, e.g. semi-circumferentially, around a pipe. A pair of opposing strongback clamping devices 400 may be disposed circumferentially around a pipe. Strongback clamping device 400 includes first side portion or hub 1310 (see FIG. 13) and second side portion or hub 430, which side portions or hubs are axially opposite each other. First side portion or hub 1310 may include an inner lip 1320 (see FIG. 13), and second side portion or hub 430 may include an outer lip 420 (see FIG. 4). Inner lip 1320 is matingly connectable to outer lip 150 of enclosure half 100 or 200, while outer lip 420 is matingly connectable to inner lip 340 of hub clamp 220 shown in FIG. 3. Accordingly, strongback clamping device 400 may be matingly connected, at its first side portion or hub 1310, to enclosure half 100 or 200 and, at its second side portion or hub 430, to hub clamp 220. It is noted that, in so connecting strongback clamping device 400 to an enclosure half 100 or 200 or a hub clamp 220, that is disposed around a pipe, the strongback clamping device 400 is also being placed or disposed around the pipe. In such mating connection, when the components in question are disposed circumferentially around a pipe, outer lip 150 of enclosure half 100 or 200 is disposed to lie at a radially interior position while inner lip 1320 of strongback clamping device 400 is disposed to lie at a radially exterior position (in other words, outer lip 150 will lie radially between the pipe and inner lip 1320), and outer lip 420 of strongback clamping device 400 is disposed to lie at a radially interior position while inner lip 340 of hub clamp 220 is disposed to lie at a radially exterior position (in other words, outer lip 420 will lie radially between the pipe and inner lip 340). Accordingly, a pair of opposing strongback clamping devices 400 can be matingly connected to a pair of opposing enclosure halves 100 or 200 while the pair of opposing enclosure halves 100 or 200 is disposed circumferentially around the pipe, and a pair of opposing hub clamps 220 can be matingly connected to a pair of opposing strongback clamping devices 400 while the pair of opposing strongback clamping devices 400 is disposed circumferentially around the pipe. Thus, additional hub clamps and enclosure halves can be connected to pre-existing modular repair enclosures including strongback clamping devices 400 (e.g. enclosure half-strongback clamping device concatenations already attached to the pipe) and strongback clamping devices 400 can be connected to (enclosure halves of) pre-existing modular repair enclosures.

Turning now to FIG. 5, in accordance with some embodiments of the present disclosure, there is shown an unassembled modular repair enclosure including two sets of components, each set including two enclosure halves attached to a hub clamp therebetween. Specifically, enclosure half 1 500 and enclosure half 2 505 are both matingly connected to hub clamp Hub Clamp1 220 at respective side portions or hubs 310 thereof, and enclosure half 3 505 and enclosure half 4 500 are both matingly connected to hub clamp Hub Clamp2 220 at respective side portions or hubs 310 thereof. The modular repair enclosure includes sealant 510 along grooves and contains a pipe 520. Enclosure half 1 500 and enclosure half 4 500 each include a void section 108, pipe retainer sections 120, two axially opposite end portions or hubs 102, outer lips 150, primary groove 110, angled grooves 105 and clamping holes 115. Enclosure half 2 505 and enclosure half 3 505 each include a void section 108, pipe retainer sections 120, two axially opposite end portions or hubs 102, outer lips 150, angled grooves 105 and clamping holes 115 but include only end portions of a primary groove (not labeled in FIG. 5, but visible in enclosure half 2 505 as containing sealant) in accordance with the embodiment of the present disclosure shown in FIG. 5. It is noted that the two axially opposite end portions or hubs 102 of enclosure half 1 500, enclosure half 2 505, enclosure half 3 505 or enclosure half 4 500 may collectively be referred to as a single (combined) end portion. Enclosure half 1 500, Hub Clamp1 220, and enclosure half 2 505 are positioned over enclosure half 3 505, Hub Clamp2 220, and enclosure half 4 500, respectively, around the pipe. Clamping holes are aligned and fasteners such as clamping bolts and nuts (not shown in FIG. 5) are attached to complete assembly of the modular repair enclosure (completed assembly not shown in FIG. 5). Sealant 510 is then injected through a number of injection points (not shown in FIG. 5) provided in the modular repair enclosure, which injection points may be connected directly to primary grooves 110. In accordance with some embodiments of the present disclosure, the sealant 510 may be a Teflon™ fiber sealant. Primary grooves 110 and those angled grooves 105 containing sealant 510 in each enclosure half (i.e. angled grooves 105 that are adjacent to clamp1 220 or Clamp2 220) and sealant groove 320 (see FIG. 3) in each hub clamp of the modular repair enclosure provide a continuous seal around the pipe, stopping the leaks in the pipe.

Figure 6:
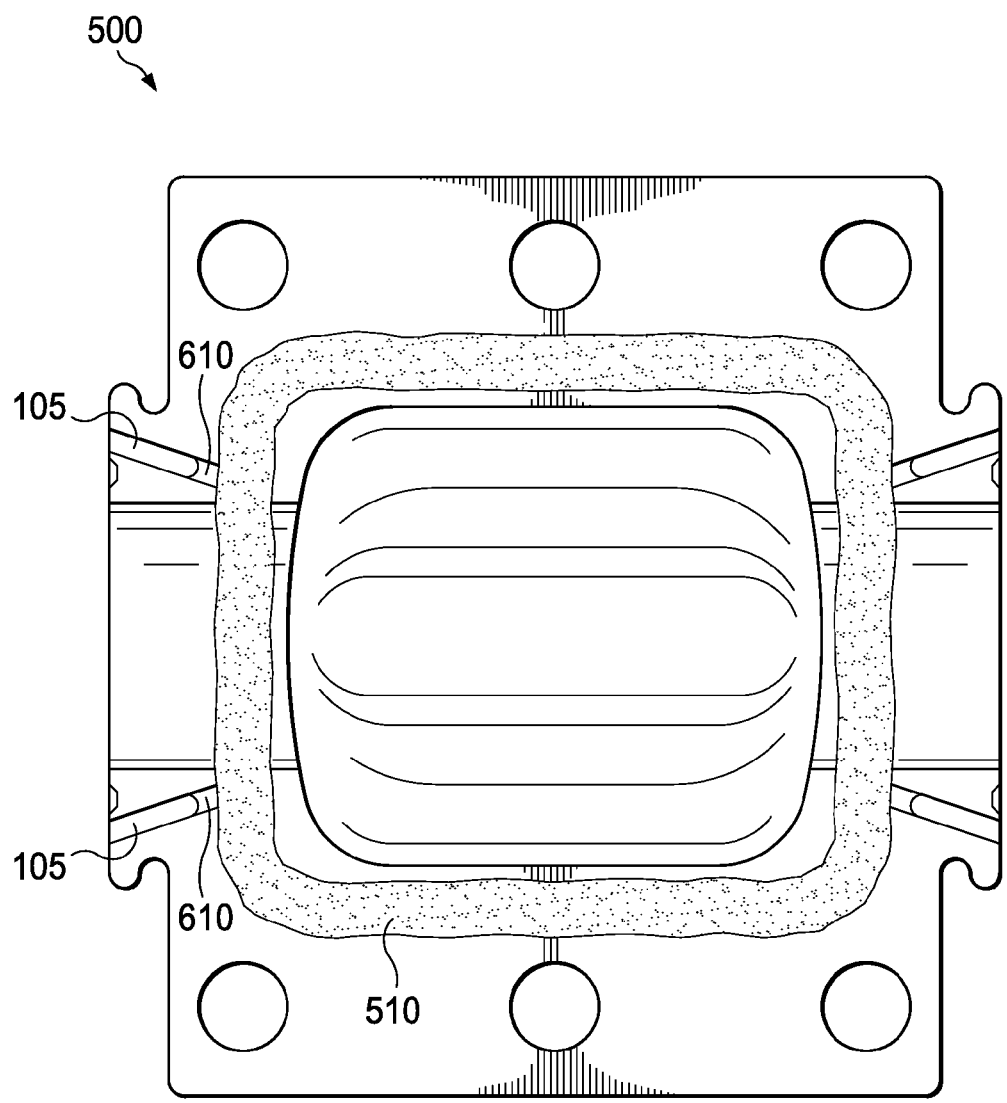
FIG. 6, in accordance with some embodiments of the present disclosure, shows a more detailed view of one enclosure half, including angled grooves, of the modular repair enclosure of FIG. 5.
Figure 11:
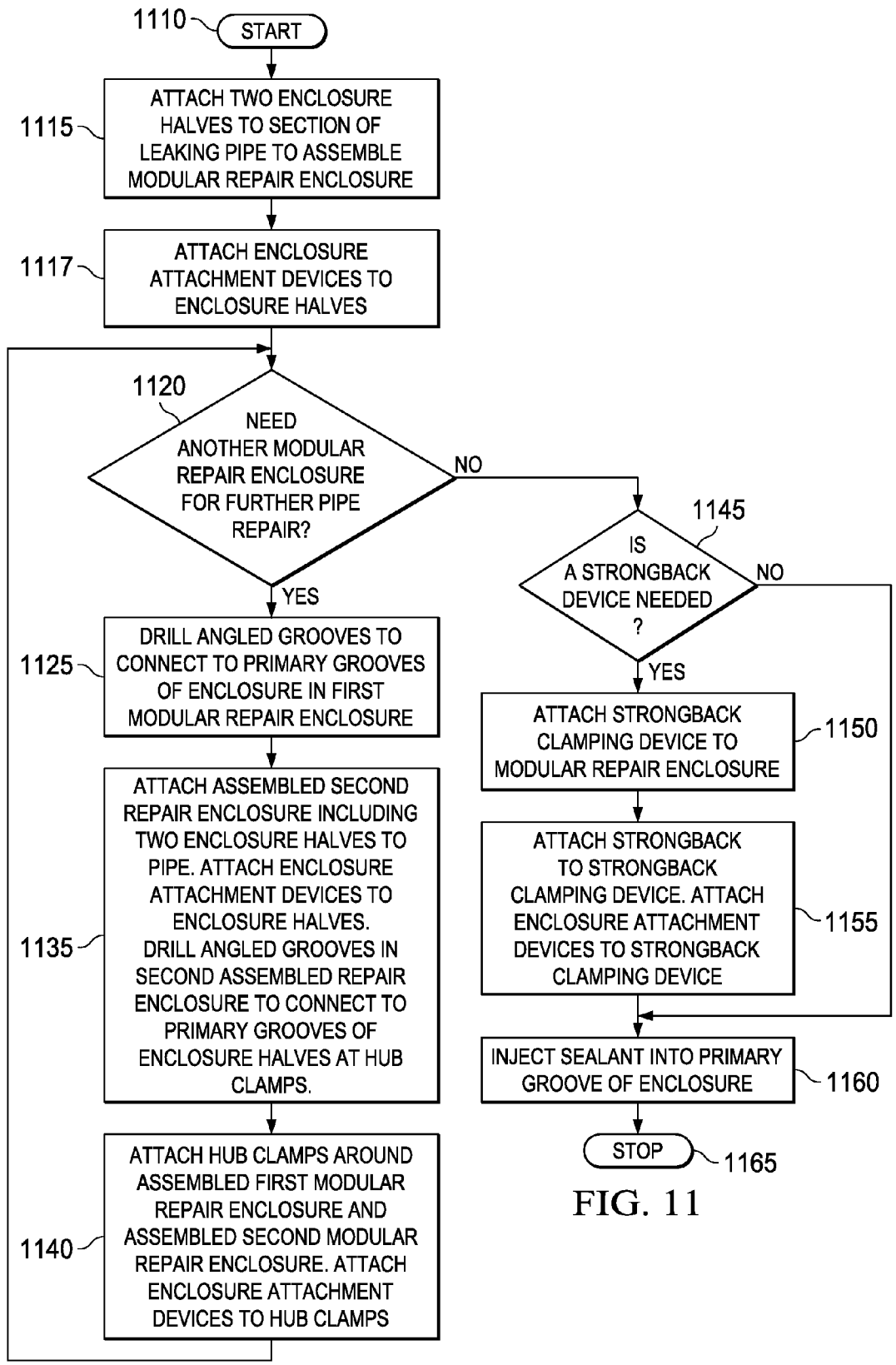
FIG. 11, in accordance with some embodiments of the present disclosure, is a flow chart showing installation of modular repair enclosures to repair pipe leaks.

FIG. 6 shows a more detailed view of enclosure half 500 of the modular repair enclosure of FIG. 5. Sealant 510 injected into the primary groove 110 is visible in FIG. 6. As shown in FIG. 11 and described in more detail below, after the enclosure halves have been attached to complete assembly of the modular repair enclosure, a drill with drill bit of diameter 3/16 inch and length ¾ inch is used in the angled groove 105 to drill a drill hole passage 610. That is, each angled groove 105 is initially formed as a blind hole (as seen e.g. in FIG. 5 in the hubs 102 of enclosure half 2 505 and enclosure half 3 505 that are not adjacent to hub clamp 220); by drilling drill hole passage 610 at the end of angled groove 105, angled groove 104 is rendered a through hole (as seen e.g. in FIG. 6). Thus, drill hole passage 610 connects the angled groove 105 to the primary groove 110 and allows sealant to travel from one enclosure half to the next enclosure half across the hub clamp 220 (via sealant groove 320), as shown in FIG. 5 for the modular repair enclosure illustrated therein, in which each of the two hub clamps 220 is matingly connected to an enclosure half at either side portion or hub 310 thereof. With regard to the enclosure halves, it is noted that no drill hole passages have been drilled in those of the axially opposite end portions or hubs 102 thereof that are not matingly connected to a hub clamp (i.e. at the upper ends of enclosure half 1 500 and enclosure half 3 505, and the lower ends of enclosure half 2 505 and enclosure half 4 500, as shown in FIG. 5).

The term "blind hole" is used in the immediately preceding discussion and throughout the entirety of this document to mean a hole that extends to a certain depth in but does not go all the way through the substrate, i.e. does not break through to the other side of the substrate, while the term "through hole" is used herein to mean a hole that goes all the way through the substrate, i.e. breaks through to the other side of the substrate. In the case of this disclosure, 'breaking through to the other side of the substrate' means breaking through to the portion of primary groove 110 that is closest to the bottom or closed end (i.e. prior to drilling) of the angled groove 105 in question.

Figure 7:
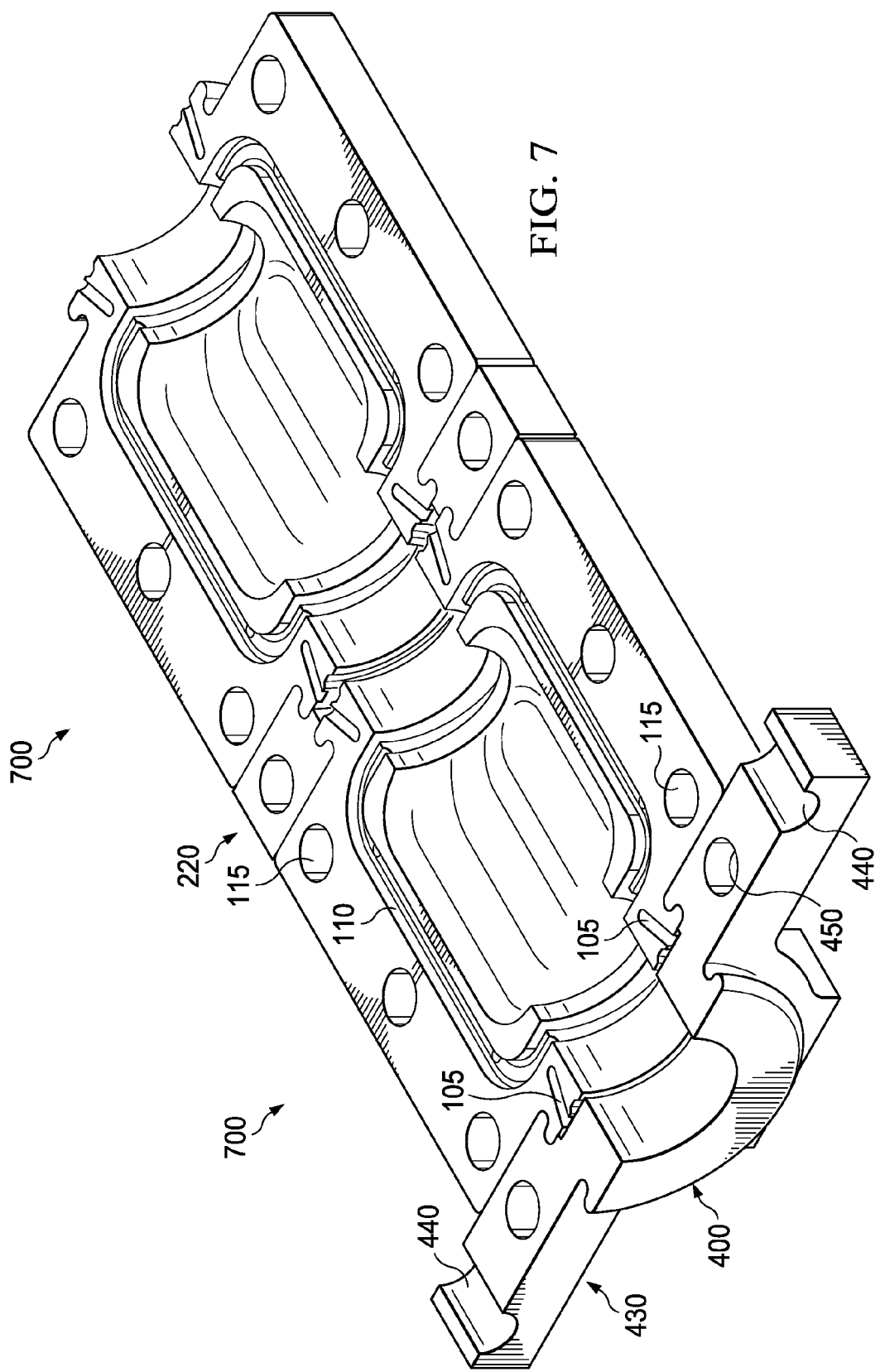
FIG. 7, in accordance with some embodiments of the present disclosure, shows two enclosure halves attached by a hub clamp there between, with one of the enclosure halves being attached to a strongback clamping device at the end opposite the end attached to the hub clamp.

Referring now to FIG. 7, there are shown two enclosure halves 700 attached by a hub clamp 220 therebetween, with one of the enclosure halves 700 being attached in addition (at its other end) to a strongback clamping device 400. Thus, strongback clamping device 400 is attached to the enclosure half 700 at the axially opposite end portion or hub thereof that is opposite the axially opposite end portion or hub thereof that is attached to hub clamp 220. Put another way, FIG. 7 shows a concatenation of enclosure half-hub clamp-enclosure half-strongback clamping device. In accordance with some embodiments of the preferred disclosure, the strongback clamping device 400 includes strongback holders 440 and clamping holes 450. The strongback holders 440 retain strongback rods (not shown in FIG. 7) to maintain structural integrity of the pipeline if so needed. The angled grooves 105 that are adjacent strongback clamping device 400 are not drilled all the way to the primary groove 110 as a second enclosure half is not attached (via a hub clamp 220) to the strongback clamping device 400 on the side of side portion or hub 430; rather, side portion or hub 430 is a free end of strongback clamping device 400, as shown in FIG. 7. In accordance with some embodiments of the preferred disclosure as shown in FIG. 7, the strongback clamping device 400 does not include angled grooves or primary grooves. Thus, sealant does not have to flow from primary groove 110 of enclosure half 700 through angled grooves 105 to strongback clamping device 400, and another drilling of the angled grooves 105 is not required. In normal use of a modular repair enclosure, drill hole passages would be drilled in the angled grooves 105 in each enclosure half 700 that are adjacent to hub clamp 220, connecting those angled grooves 105 to respective primary grooves 110, as described with reference to FIG. 6, although this is not shown in FIG. 7.

Figure 13:
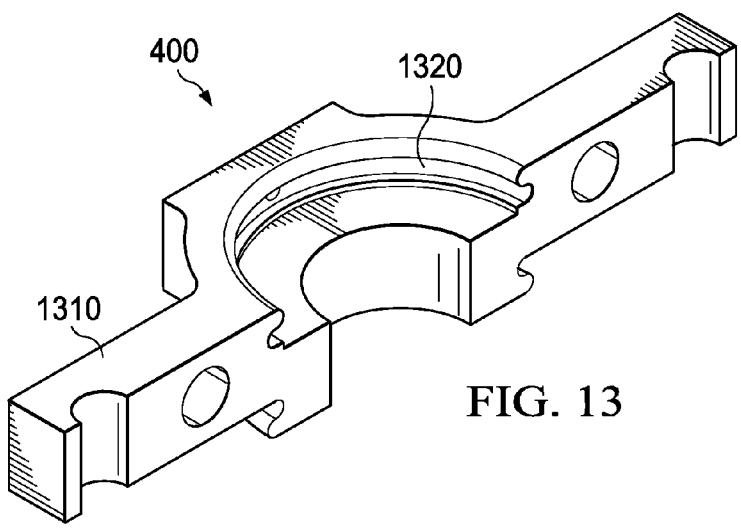
FIG. 13, in accordance with some embodiments of the present disclosure, shows a more detailed view of the strongback clamping device of FIGS. 4 and 7.

A more detailed view of the strongback clamping device 400 of FIG. 7 is shown in FIG. 13. As discussed, inner lip 1320 of the strongback clamping device 400 is capable of matingly connecting with the outer lip 150 of the enclosure halves 100, 200 of FIGS. 1-2.

Turning now to FIG. 8, an assembled modular repair enclosure including two enclosure halves 800 joined together is shown. As shown in FIG. 8, enclosure halves 800 constitute a pair of opposing enclosure halves that are disposable circumferentially around a pipe (see e.g., FIG. 5), each of the two enclosure halves 800 individually being disposable partially circumferentially, e.g. in the illustrated embodiment semi-circumferentially, around the pipe. In accordance with some embodiments of the preferred disclosure, the void or opening formed by the void sections (not visible in FIG. 8) and pipe retainer sections 820 of enclosure halves 800 is capable of holding a 2 inch diameter pipe section (not shown in FIG. 8) of the pipeline. In accordance with other embodiments, modular repair enclosures may also be designed that can hold various different diameters of pipe. The outer lip 840 attaches to the inner lip 340 of a hub clamp 220 as shown in FIG. 3 or to inner lip 1320 of strongback clamping device 400 as shown in FIG. 13. As shown in FIG. 11 and described more specifically below, after the modular repair enclosure formed by the two enclosure halves 800 is placed around the leaking pipe, enclosure attachment devices are attached and, if further sections of the pipe are leaking, the angled grooves 850 are drilled to connect the angled grooves 850 to the primary grooves (not shown in FIG. 8), a second modular repair enclosure is placed around the leaking pipe, additional enclosure attachment devices are attached, the appropriate angled grooves in the second modular repair enclosure are drilled, hub clamps 220 and, if necessary, a strongback clamping device 400 and a strongback rod are attached, and additional enclosure attachment devices are attached for the hub clamps and the strongback clamping device (if present).

Figure 9:
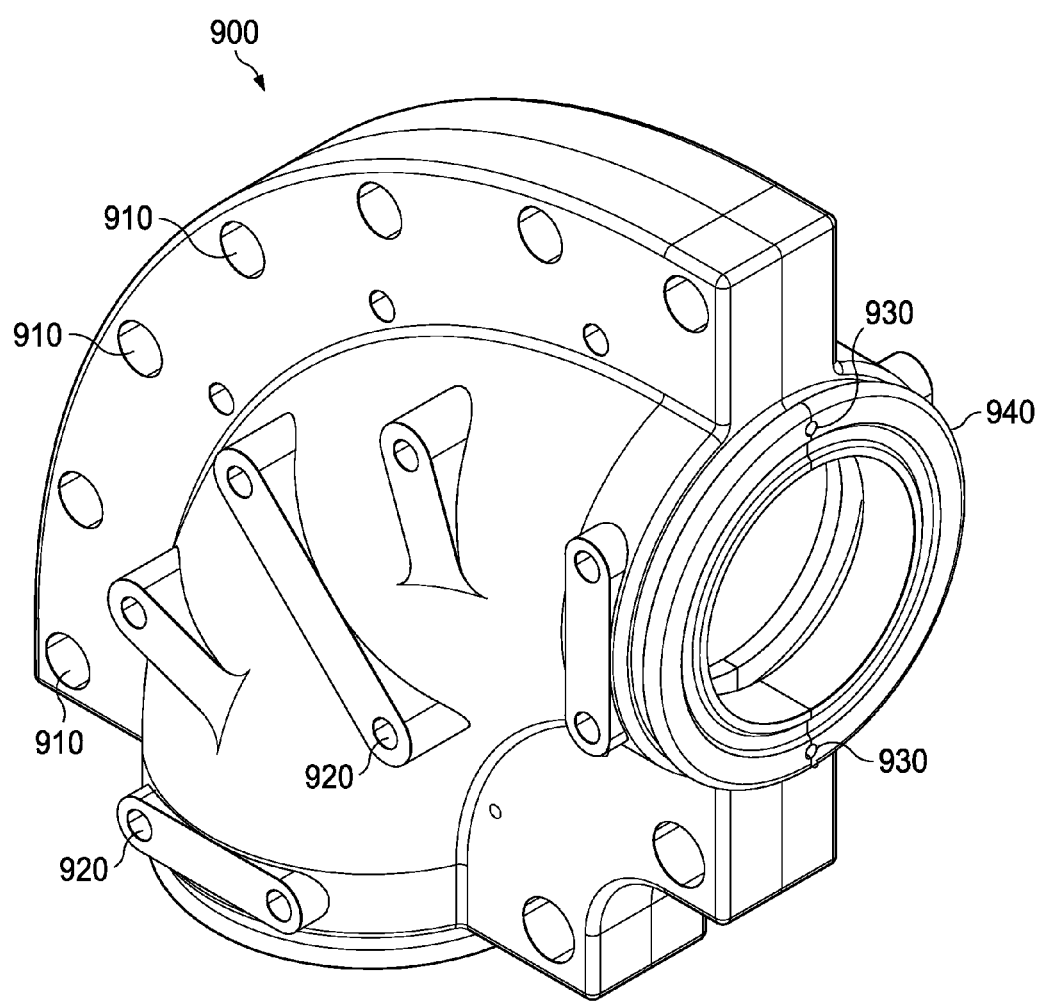
FIG. 9, in accordance with some embodiments of the present disclosure, is a schematic of an assembled elbow pipe repair enclosure.

Turning now to FIG. 9, in accordance with some embodiments of the present disclosure, a schematic of assembled elbow modular pipe repair enclosure 900, made up of two elbow enclosure halves, is shown. An elbow section of pipe (not shown in FIG. 9) of 2 inch diameter in the pipeline that is leaking may be repaired by enclosing the elbow section of pipe in the elbow modular pipe repair enclosure 900. As shown in FIG. 9, the elbow modular pipe repair enclosure 900 includes clamping holes 910, sealant injection points 920, angled grooves 930 and outer lip 940 for connection to hub clamp 220 or strongback clamping device 400.

Figure 10A:
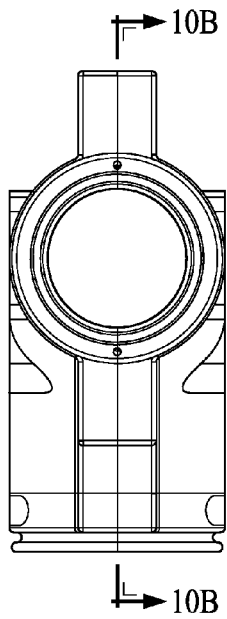
FIG. 10A, in accordance with some embodiments of the present disclosure, shows a first view of the elbow pipe repair enclosure.
Figure 10B:
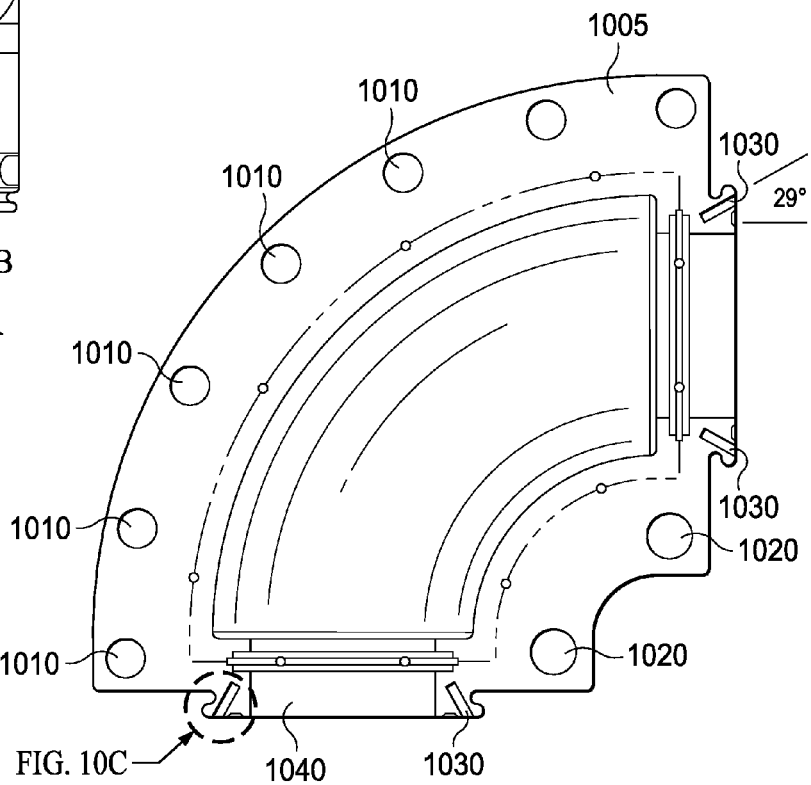
FIG. 10B, in accordance with some embodiments of the present disclosure, shows a view of the elbow pipe repair enclosure of FIG. 10A taken along the line 10B-10B.
Figure 10C:
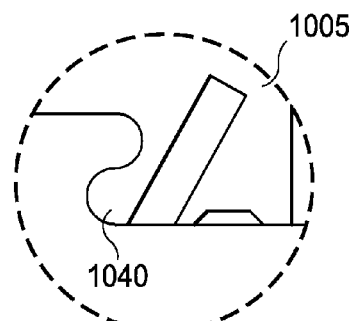
FIG. 10C, in accordance with some embodiments of the present disclosure, shows a detailed view of a portion of elbow pipe repair enclosure of FIG. 10B, as indicated by the dashed circle in FIG. 10B.

FIG. 10A shows a first view looking at the 2 inch pipe retainer section of the elbow pipe repair enclosure 900. In accordance with some embodiments of the present disclosure, the 2 enclosure halves of the elbow modular pipe repair enclosure have a diameter width of 5½ inches. FIG. 10B shows a view of the elbow modular pipe repair enclosure of FIG. 10A taken along the line 10B-10B. In accordance with some embodiments of the present disclosure, the clamping hole1 1010 is ¾ inch in diameter for ⅝ inch clamping bolt and clamping hole2 1020 is ⅞ inch in diameter for ¾ inch clamping bolt. The angled groove 1030 is offset at an angle of 29 degrees from the longitudinal axis of a pipe (not shown) entering the elbow modular pipe repair enclosure at the opening thereof closest to the same angled groove 1030 (or 29 degrees from the horizontal as seen at the top of the elbow modular pipe repair enclosure in FIG. 10B, and 29 degrees from the vertical as seen at the bottom of the elbow modular pipe repair enclosure in FIG. 10B), to allow an operator to place the drill in the angled groove 1030 unobstructed by the pipe and drill the drill hole passage during installation of modular pipe repair enclosure, while enclosure half 1005 is disposed around the pipe. FIG. 10C shows a detailed view of a portion of FIG. 10B including a portion of enclosure half 1005, a portion of outer lip 1040, and angled groove 1030 of the elbow pipe repair enclosure 900. It is noted that this feature whereby the angled groove is offset at an angle of 29 degrees from the longitudinal axis of a pipe may also be applied to other embodiments set forth herein, e.g. in the case of repairing a leak along a straight section of pipe.

Referring now to FIG. 11, a flow chart illustrating a method or process for repairing leaks in pipes by installation of modular repair enclosures in accordance with some embodiments of the present disclosure is shown. In step 1115, two enclosure halves are placed opposite each other, in the manner shown in FIG. 8, around a section of leaking pipe to assemble a modular repair enclosure. In step 1117, enclosure attachment devices, that is, fasteners such as clamping bolts or clamping studs, are placed into respective clamping holes for attachment of the enclosure halves in the first modular repair enclosure. An operator or technician using detection tools in step 1120 determines if more leaks are present in the pipe and another modular repair enclosure is needed for repair. If further pipe repairs are needed, in step 1125 the operator or technician drills a drill hole passage in each of the angled grooves in the axially opposite end portions or hubs that will be adjacent the hub clamps that will be inserted to accommodate enclosure halves of a second modular repair enclosure; the drill hole passages serve to connect these angle groves to primary grooves of the respective same enclosure halves in the modular repair enclosure. In step 1135, the second assembled modular repair enclosure including two enclosure halves, disposed opposite each other in the manner shown in FIG. 8, is placed over the pipe. Enclosure attachment devices, that is, fasteners such as clamping bolts or clamping studs, are placed into respective clamping holes for attachment of the enclosure halves in the second modular repair enclosure. Drill hole passages are drilled in the angled grooves in the axially opposite end portions or hubs (of the enclosure halves of the second modular repair enclosure) that will be adjacent the hub clamps that will be connected to the enclosure halves of the second assembled modular repair enclosure. Again, the drill holes connect these angled grooves to the primary grooves of the respective same enclosure halves in the second assembled modular repair enclosure. In step 1140 a pair of opposing hub clamps is disposed around the pipe and connected to the first and second assembled modular repair enclosures, which are disposed circumferentially around the pipe so as to cover the leaks in the pipe; the hub clamps are attached using enclosure attachment devices, which are placed in the hub clamps. The enclosure attachment devices are fasteners, such as clamping bolts or clamping studs, which are placed into respective clamping holes of the hub clamps. Returning to step 1120, the operator or technician determines if more leaks are present in the pipe and another modular repair enclosure is needed. If no further leaks are present in the pipe and a strongback device is not needed 1145, in step 1160, sealant is injected into injection points connected to primary grooves and angled grooves of the modular repair enclosure. If no further leaks are present in the pipe but a strongback device is needed to reinforce the structural integrity of the pipe in step 1145, then strongback clamping devices as shown in FIGS. 4, 7 and 13 are used to assemble strongback modular repair enclosure. In step 1150, the strongback clamping devices are disposed around the pipe and connected to the modular repair enclosure. In step 1155, strongback rods ("strongbacks") are placed into strongback holders in the strongback modular repair device. After the strongbacks have been attached to the strongback modular repair enclosure, the strongback clamping devices are attached using enclosure attachment devices, that is, fasteners such as clamping bolts or clamping studs, that are placed into respective clamping holes of the strongback clamping devices for attachment thereof. Then, in step 1160, sealant is injected into injection points connected to primary grooves and angled grooves of the modular repair enclosure(s). Installation of modular repair enclosures to repair pipe leaks in the pipeline is complete and the method stops in step 1165. Steps 1145, 1150, and 1155 may be performed as a process separate from the other steps of FIG. 11, or at a time different from that at which the other steps of FIG. 11 are performed. It will be understood by one of ordinary skill in the art, in view of the remainder of this disclosure, that the order of certain of the steps of FIG. 11 may be varied.

Figure 12:
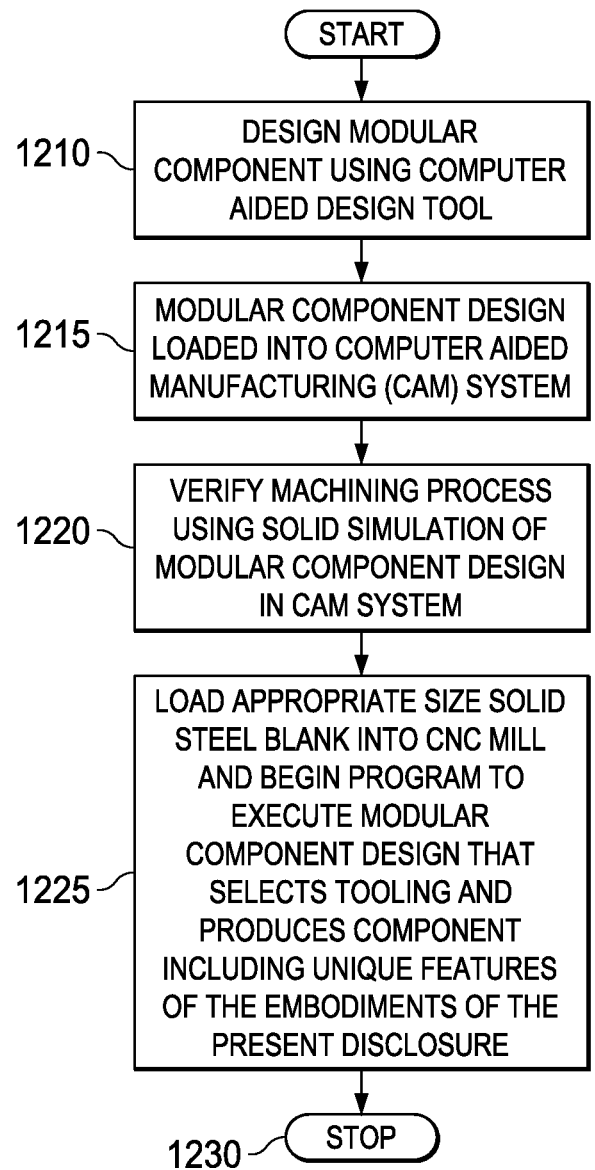
FIG. 12, in accordance with some embodiments of the present disclosure, is a flowchart showing manufacture of the modular components.
Figure 14A:
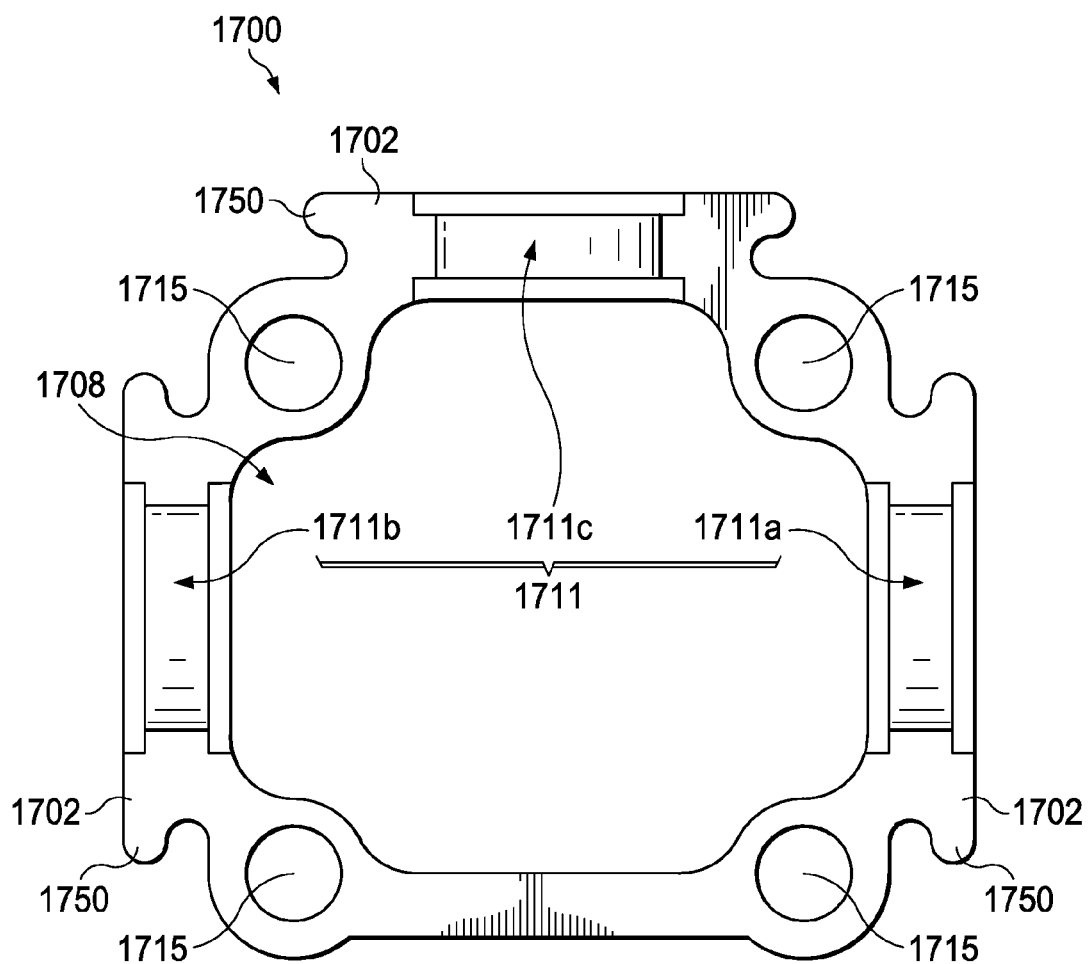
FIGS. 14A and 14B are a top plan view and an elevation view, respectively, of an enclosure portion, in accordance with some alternative embodiments of the present disclosure.
Figure 14B:
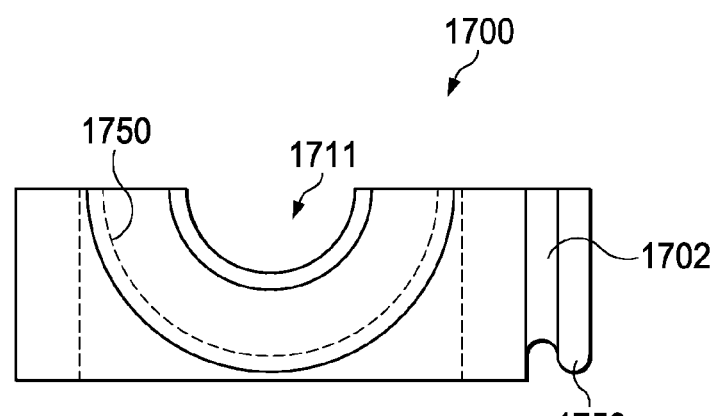

Turning now to FIG. 12, a flowchart for manufacture of modular components including enclosure halves, hub clamps, strongback clamping devices and so on for assembly of modular repair enclosures is shown. In step 1210, in accordance with some embodiments of the present disclosure, the given modular component is designed using Solid Works™, a three dimensional Computer Aided Design (CAD) system. The modular component design is then sent to a Computer Aided Manufacturing (CAM) system in step 1215 that, in accordance with some embodiments of the present disclosure, includes the Esprit™ system that controls a computer numerical control (CNC) mill.

Esprit™ is a high performance CAM system for a full range of machine tool applications. Esprit™ delivers full-spectrum programming for 2-5 axis milling, 2-22 axis turning, 2-5 axis wire EDM, multitasking mill-turning machining, and B-axis machine tools. Esprit's™ capabilities include machining any part geometry (solid, surface or wireframe), universal post processing to format G-code for virtually any machine tool, and solid simulation and verification with dry runs rendered in dynamic solids for optimal part quality and consistency. Esprit's™ multitasking component provides capabilities for driving mill-turn machines, multi-axis lathes, and Swiss-style machine tools. Esprit™ provides synchronization of simultaneous cutting cycles using any combination of turrets and spindles for milling or turning, factory-certified post processors for all the leading multitasking machine tools, and dynamic solid simulations for dry run verification of the machining processes.

A machinist operator using Esprit™ CAM system or similar system verifies the machining process using solid simulation of the modular component design in step 1220. Finally, in step 1225, the appropriate size solid steel blank that may be 516-grade 70 steel is loaded into the CNC mill; Esprit™ or a similar system receives the modular component design as an input and initiates a program to execute the modular component design. The program selects the proper tooling in CNC mill and controls the CNC mill to produce the modular component that includes the unique features of the embodiments of the present disclosure.

Alternative embodiments will now be discussed with reference to FIGS. 14A-24. These embodiments provide modular pipe repair enclosure systems and methods, using enclosures that may be referred to as multi-modular enclosures or multiple mechanical enclosures (MME). These systems and methods include a relatively small number of components, but permit repairs of leaks in pipe sections of different sizes (e.g., different pipe diameters) and different types (e.g., straight sections, elbow sections, and T-sections). Thus, these alternative embodiments provide for highly portable yet versatile systems and methods for repairing leaks in a wide range of situations. In these alternative embodiments, leaks are generally repaired using a void fill method, in contrast to the perimeter seal method generally used in the embodiments discussed heretofore. Inasmuch as these two different methods of leak repair may be indicated by different kinds of leaks, combining the systems and methods of the embodiments discussed heretofore with the alternative embodiments discussed below thus provides still more versatile systems and methods for repairing an even wider range of leaks while still retaining the desired portability.

Turning to FIGS. 14A-23, in accordance with some alternative embodiments of the present disclosure, there is shown an enclosure portion 1700 that may include three recessed portions 1711 that may serve as pipe retainer sections. Enclosure portion 1700 may be disposed around a pipe, e.g., axially along and partially circumferentially, e.g., semi-circumferentially, around a pipe, and a pair of opposing enclosure portions 1700 may be disposed circumferentially around a pipe to form an enclosure (see FIG. 18, assembling an enclosure, and FIG. 19B, an assembled enclosure). When a pair of opposing enclosure portions 1700 is disposed circumferentially around a pipe to form an enclosure, the three recessed portions 1711 of one of the opposing enclosure portions 1700 may align, respectively, with the three recessed portions 1711 of the other one of the opposing enclosure portions 1700, such that the formed enclosure has three pairs of aligned recessed portions (see FIGS. 18 and 19B). Each of the pairs of aligned recessed portions 1711 may form an opening 1712 in the formed enclosure. Each of the openings 1712 may accommodate the pipe enclosed in the enclosure. Recessed portions 1711 may be at least substantially semicircular, and openings 1712 may be at least substantially circular.

Figure 19A:
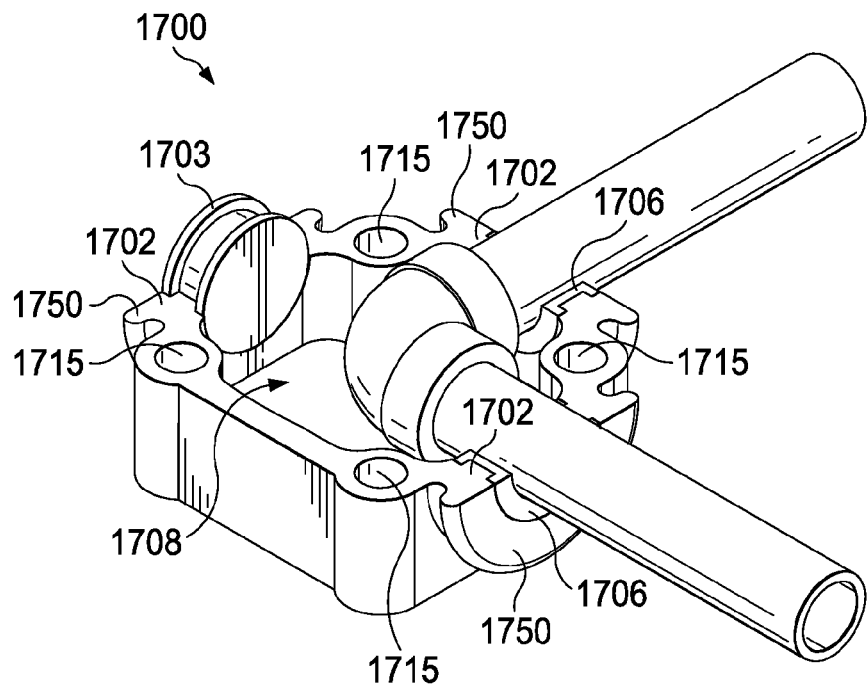
FIG. 19A shows an enclosure portion with sleeve portions and a blank inserted therein, holding an elbow section of pipe, in accordance with some alternative embodiments of the present disclosure.
Figure 19B:
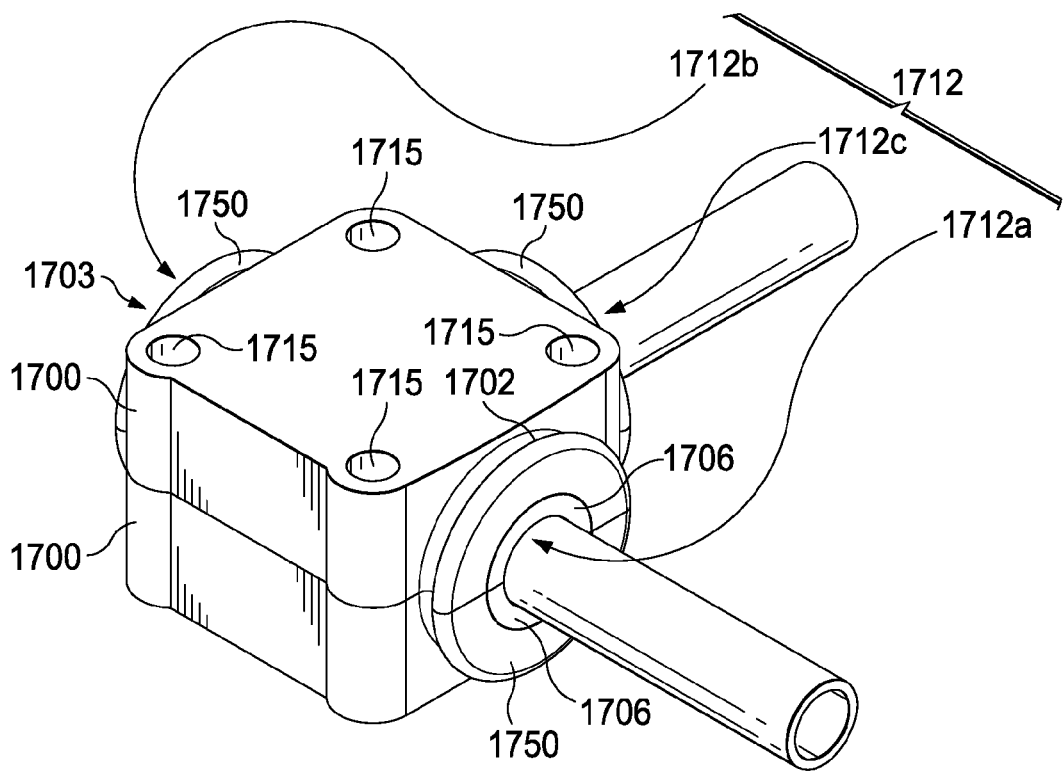
FIG. 19B shows an enclosure holding an elbow section of pipe for repairing a leak therein, in accordance with some alternative embodiments of the present disclosure.
Figure 20:
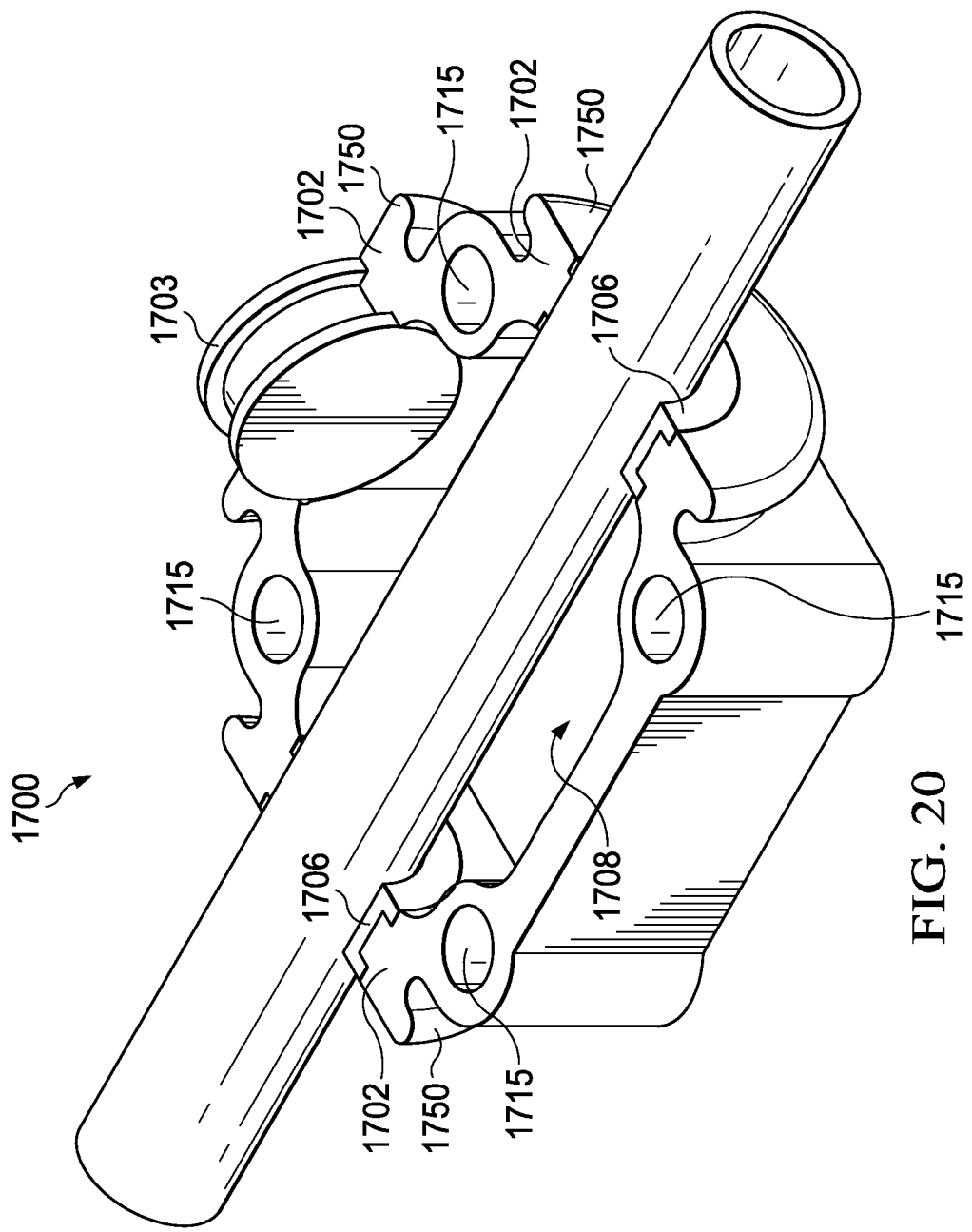
FIG. 20 shows an enclosure portion with sleeve portions and a blank inserted therein, holding a straight section of pipe, in accordance with some alternative embodiments of the present disclosure.

Among the three recessed portions 1711 of an enclosure portion 1700 (or among the three openings 1712 of an enclosure), a first recessed portion 1711a and a second recessed portion 1711b (or a first opening 1712a and a second opening 1712b) may be arranged at an angle of 180 degrees with respect to each other, such that a straight line section of pipe may be accommodated by the first and second recessed portions 1711a and 1711b (or openings 1712a and 1712b), as shown in FIG. 20. Further, a first recessed portion 1711a and a third recessed portion 1711c (or a first opening 1712a and a third opening 1712c) may be arranged at an angle of 90 degrees with respect to each other, such that an elbow section of pipe may be accommodated by the first and third recessed portions 1711a and 1711c (or openings 1712a and 1712c), as shown in FIGS. 19A and 19B. Given this arrangement of the first and second recessed portions 1711a and 1711b (or openings 1712a and 1712b) and this arrangement of the first and third recessed portions 1711a and 1711c (or openings 1712a and 1712c), it follows that the second and third recessed portions 1711b and 1711c (or openings 1712b and 1712c) are arranged at an angle of 90 degrees with respect to each other, and thus that a T-section of pipe may be accommodated by the first, second and third recessed portions 1711a, 1711b and 1711c (or openings 1712a, 1712b and 1712c), as shown in FIG. 21.

Figure 21:
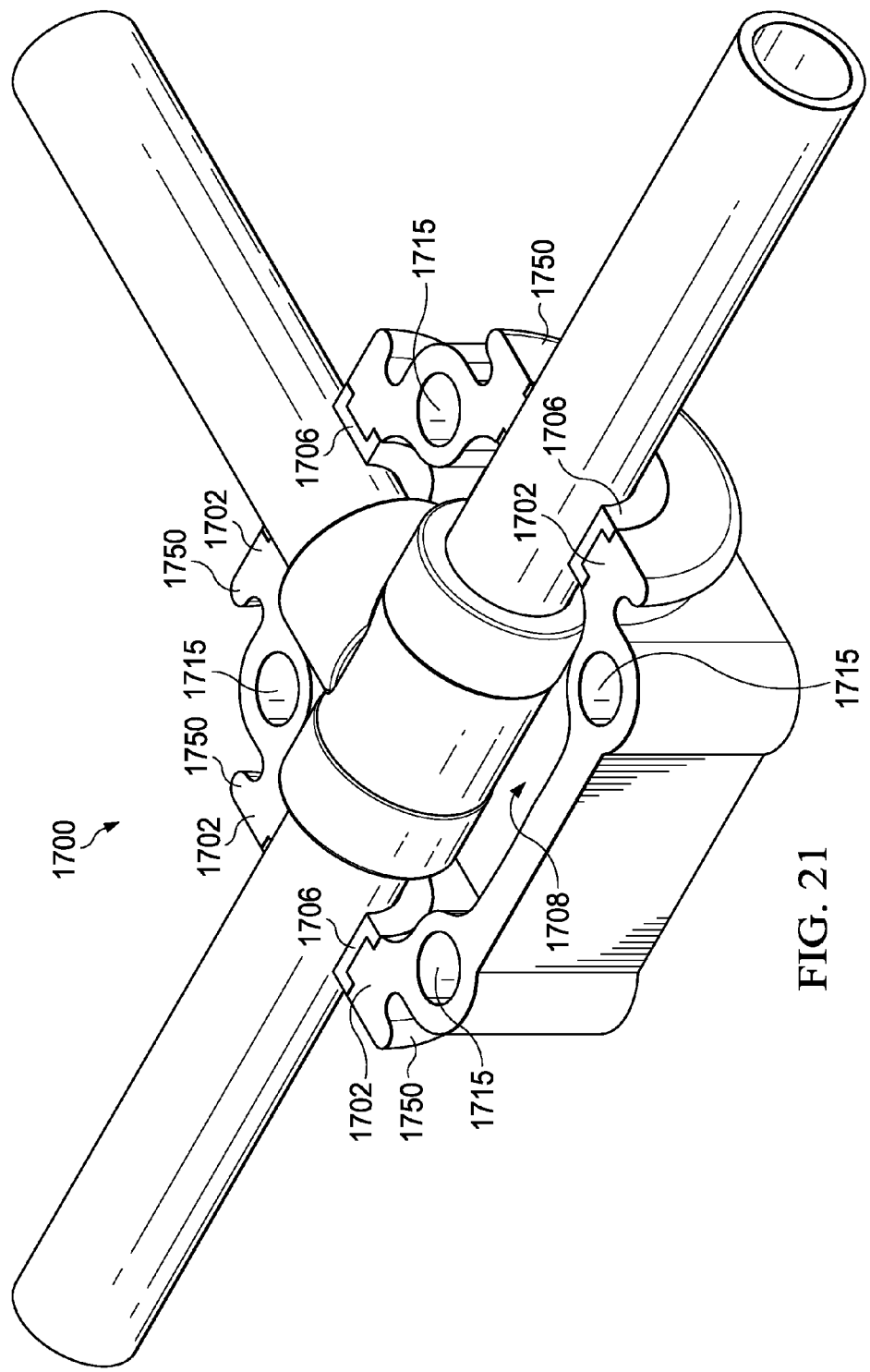
FIG. 21 shows an enclosure portion with sleeve portions inserted therein, holding a T-section of pipe, in accordance with some alternative embodiments of the present disclosure.

When the enclosure is used to enclose a T-section of pipe, all three openings 1712a, 1712b and 1712c of the enclosure are required and are employed to accommodate the T-section of pipe, as shown in FIG. 21. However, when the enclosure is used to enclose a straight section of pipe, only the first and second openings 1712a and 1712b of the enclosure are required and are employed to accommodate the straight section of pipe, as shown in FIG. 20. In this case, the third opening 1712c is closed by a blank 1703. Similarly, when the enclosure is used to enclose an elbow section of pipe, only the first and third openings 1712a and 1712c of the enclosure are required and are employed to accommodate the elbow section of pipe, as shown in FIGS. 19A and 19B. In this case, the second opening 1712b is closed by a blank 1703. (Note that in FIG. 19B, blank 1703 and second opening 1712b are indicated by arrows pointing to the location of these elements, which are not visible in FIG. 19B but are indicated by other figures, e.g., FIGS. 14A, 14B, 17, 18 and 19A. Similarly, in FIG. 19B third opening 1712c is indicated by an arrow pointing to the location of this element, which is not visible in FIG. 19B but is indicated by the presence of the pipe section extending through third opening 1712c in FIG. 19B and by other figures, e.g., FIGS. 14A, 14B, 17, 18 and 19A.) Thus, with the combination of the three openings 1712a, 1712b and 1712c and the blank 1703, the MME is a versatile repair device, applicable to, e.g., straight sections, elbow sections and T-sections of pipe. Of course, blank 1703 is not required when the enclosure is used with a T-section of pipe. Blank 1703 is additionally illustrated in FIGS. 15A, 15B, and 16A. Further aspects of blank 1703 will be discussed below.

Enclosure portion 1700 may include a void portion 1708. When enclosure portion 1700 is placed around a pipe, void portion 1708 constitutes a void between enclosure portion 1700 and the pipe. When a pair of opposing enclosure portions 1700 is disposed circumferentially around a pipe to form an enclosure, the void portions 1708 of the two opposing enclosure portions 1700 communicate with each other and form a single combined void portion of the formed enclosure, which constitutes a single void between the formed enclosure and the pipe (the combined void portion of the enclosure constituting the void between the enclosure and the pipe is not visible in the figures). The void between the formed enclosure and the pipe serves to cover one or more leaks in the pipe.

Enclosure portion 1700 may include one or more injection points (not shown). Such an injection point may be located in the central region of enclosure portion 1700 shown in FIG. 14A, or in the top surface (the surface having four holes, which are discussed below) of the enclosure shown in FIG. 19B. Such an injection point may but need not be located in the center of the indicated central region or top surface. Such an injection point may include an opening and may thus communicate with void portion 1708 of enclosure portion 1700 (and hence with the void formed by void portion 1708 of enclosure portion 1700, with the combined void portion of the enclosure formed by the two enclosure portions 1700, and with the void formed by the combined void portion). Sealant may be injected through the opening of the injection point into the void, for sealing the leak(s) in the pipe to be repaired. Any suitable sealant may be used. For example, a solid or semi-solid sealant may be used. Since in the formed enclosure, as stated, the void portions 1708 of the two opposing enclosure portions 1700 create a single combined void portion constituting a single void between the formed enclosure and the pipe, it is possible in repair of the leak(s) to inject sealant in the void from only a single injection point in one of the two opposing enclosure portions 1700; accordingly, an enclosure may be employed wherein one of the two opposing enclosure portions 1700 has an injection point and the other one does not.

Enclosure portion 1700 may also include one or more clamping holes 1715 for an enclosure attachment device, such as fastener(s), e.g., clamping bolt(s) and nut(s) (not shown). When two enclosure portions 1700 are disposed around a pipe to form an enclosure, the clamping holes 1715 of the two enclosure portions 1700 are respectively aligned and the fasteners such as clamping bolts and nuts (not shown) are installed to secure the modular repair enclosure. The term "enclosure attachment device" may refer to a plurality of devices (such as fasteners) or to a single such device, whether used alone or with other such devices.

Enclosure portion 1700 may also include one or more end portions called hubs 1702. If included, it may be preferable to include three end portions or hubs 1702. When a pair of opposing enclosure portions 1700 is disposed circumferentially around a pipe to form an enclosure, the end portions or hubs 1702 of one of the opposing enclosure portions 1700 may align, respectively, with the end portions or hubs 1702 of the other one of the opposing enclosure portions 1700. Each end portion or hub 1702 may include an outer lip 1750, which will be described further below. The end portions or hubs 1702 of an enclosure portion 1700 or of an enclosure may collectively be referred to as a single (combined) end portion.

Figure 22:
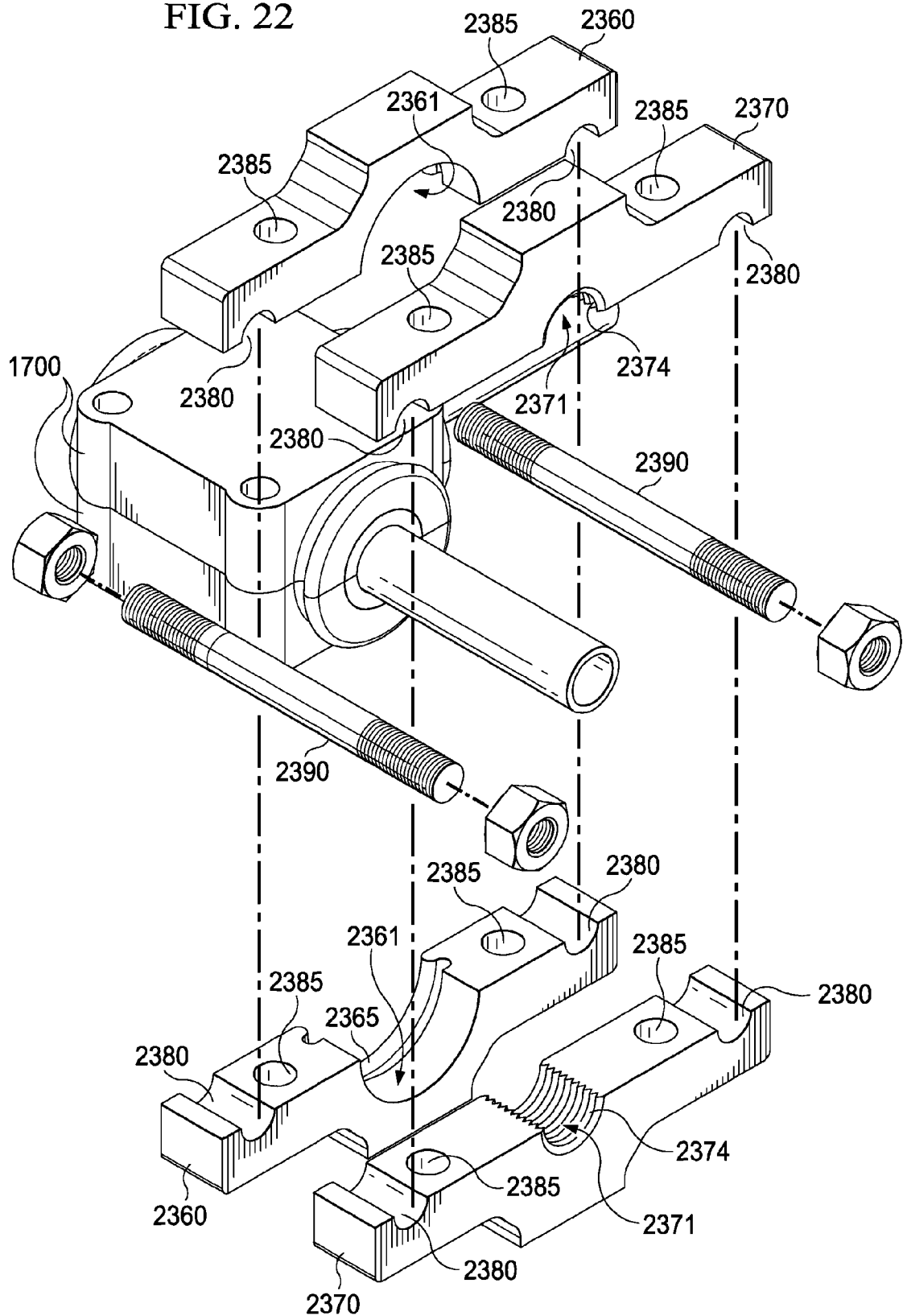
FIG. 22 is view illustrating assembly of a strongback clamping unit, including strongback rods, for installation on the enclosure shown in FIG. 19B, in accordance with some alternative embodiments of the present disclosure.
Figure 23:
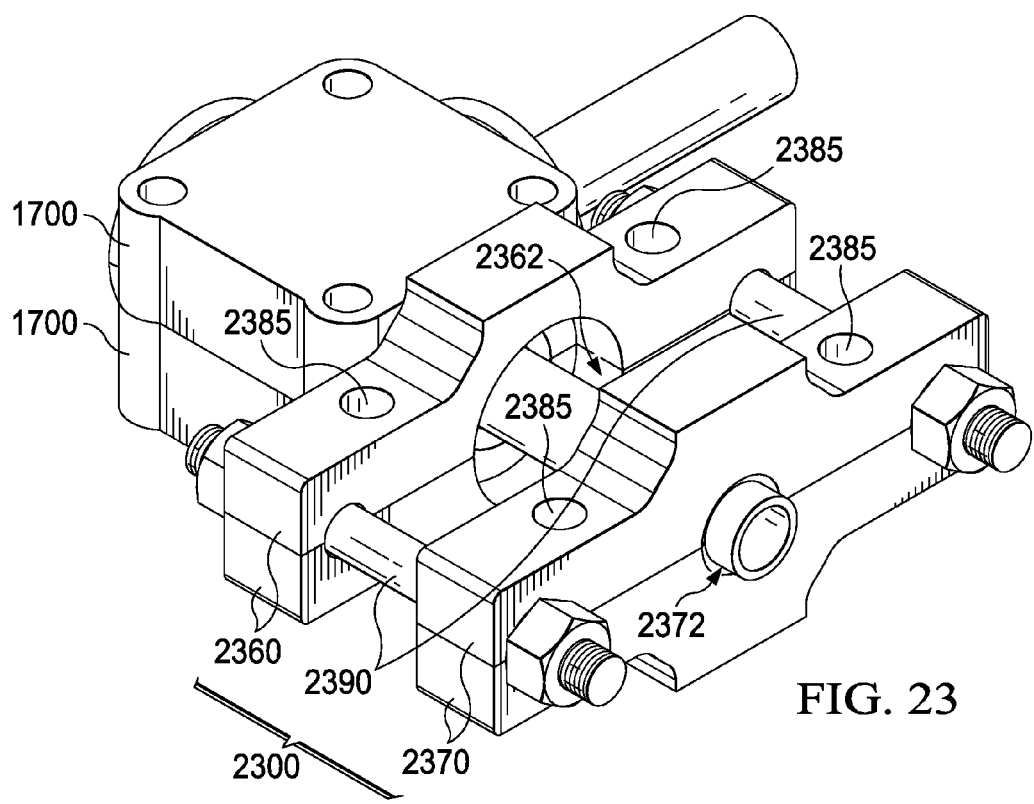
FIG. 23 is view illustrating the strongback clamping unit of FIG. 22, when fully assembled and installed on the enclosure shown in FIG. 19B, in accordance with some alternative embodiments of the present disclosure.

Turning to FIGS. 22 and 23, modular pipe repair enclosure systems using MME enclosures may include a strongback clamping unit 2300, for maintaining or enhancing structural integrity of a pipe. As illustrated, strongback clamping unit 2300 may include a pair of first strongback clamping devices 2360, a pair of second strongback clamping devices 2370, and a pair of strongback rods 2390. Each of first strongback clamping device 2360 and second strongback clamping device 2370 may be disposed around a pipe, e.g., axially along and partially circumferentially, e.g., semi-circumferentially, around a pipe. A pair of opposing first strongback clamping devices 2360 or second strongback clamping devices 2370 may be disposed circumferentially around a pipe.

First strongback clamping device 2360 may include an inner lip 2365 (see FIG. 22). Inner lip 2365 is matingly connectable to outer lip 1750 of enclosure portion 1700. Accordingly, first strongback clamping device 2360 may be matingly connected to enclosure portion 1700. It is noted that, in so connecting first strongback clamping device 2360 to an enclosure portion 1700 that is disposed around a pipe, the first strongback clamping device 2360 is also being placed or disposed around the pipe. In such mating connection, when the components in question are disposed around a pipe, outer lip 1750 of enclosure portion 1700 is disposed to lie at a radially interior position while inner lip 2365 of first strongback clamping device 2360 is disposed to lie at a radially exterior position (in other words, outer lip 1750 will lie radially between the pipe and inner lip 2365). Accordingly, a pair of opposing first strongback clamping devices 2360 can be matingly connected to a pair of opposing enclosure portions 1700 while the pair of opposing enclosure portions 1700 is disposed circumferentially around the pipe. Thus, first strongback clamping devices 2360 can be connected to (enclosure portions 1700 of) pre-existing modular pipe repair enclosures. Thus, a strongback clamping unit 2300 need not be installed with a modular pipe repair enclosure at the same time, but can be added to the enclosure at a later time.

First strongback clamping device 2360 includes a first recessed portion 2361, and second strongback clamping device 2370 includes a second recessed portion 2371. When a pair of first strongback clamping devices 2360 is disposed around a pipe, first recessed portions 2361 of the two first strongback clamping devices 2360 align and form a first opening 2362. When a pair of second strongback clamping devices 2370 is disposed around a pipe, second recessed portions 2371 of the two second strongback clamping devices 2370 align and form a second opening 2372. First and second recessed portions 2361 and 2371 may be at least substantially semicircular, and first and second openings 2362 and 2372 may be at least substantially circular. Inner diameter of first recessed portion 2361 and first opening 2362 may be larger than outer diameter of the pipe upon which the strongback clamping unit 2300 is being installed, while inner diameter of second recessed portion 2371 and second opening 2372 may be designed to fit the outer diameter of the pipe upon which the strongback clamping unit 2300 is being installed. Further, the inner surface of second recessed portion 2371 and second opening 2372 may be provided with ridges 2374 (see FIG. 22) to more securely grip the pipe upon which the strongback clamping unit 2300 is being installed.

Each of first and second strongback clamping devices 2360 and 2370 may include a strongback holder 2380 at either end thereof. Strongback holders 2380 may be formed as at least substantially semi-circular recessed portions which align to form at least substantially circular openings when a pair of opposing first or second strongback clamping devices 2360 and 2370 are disposed around a pipe, similarly to the case with recessed portions 1711 aligning to form openings 1712. Strongback holders 2380 retain strongback rods 2390 which help maintain or enhance structural integrity of the pipe.

Each of first and second strongback clamping devices 2360 and 2370 may also include one or more clamping holes 2385 for use by a securing device, such as fastener(s), e.g., clamping bolt(s) and nut(s) (not shown), which securing device may be similar or identical to the enclosure attachment device used for securing or attaching enclosure portions 1700. When a pair of strongback clamping devices 2360 or 2370 is disposed around a pipe, the clamping holes 2385 of the two strongback clamping devices 2360 or 2370 are respectively aligned and the fasteners such as clamping bolts and nuts (not shown) are installed to secure the strongback clamping unit 2300. The term "securing device" may refer to a plurality of devices (such as fasteners) or to a single such device, whether used alone or with other such devices.

Figure 15A:
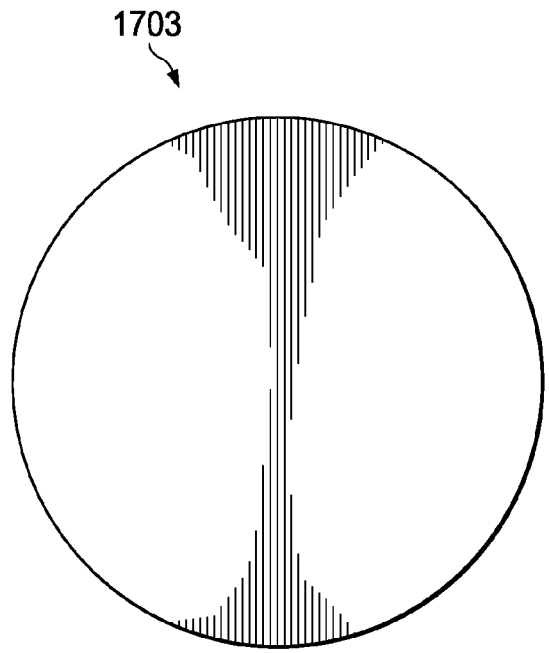
FIGS. 15A and 15B are views of a blank, and FIGS. 15C and 15D a views of a sleeve portion, in accordance with some alternative embodiments of the present disclosure.
Figure 15B:
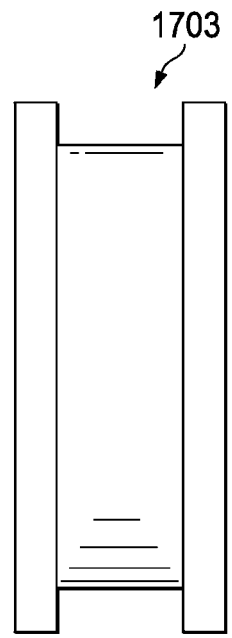
Figure 15C:
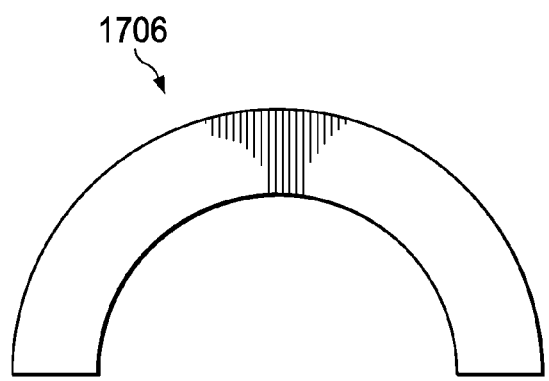
Figure 15D:
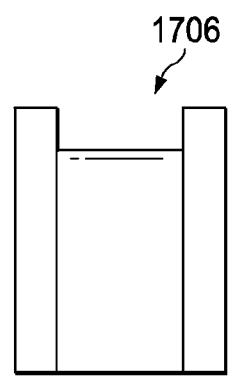
Figure 16A:
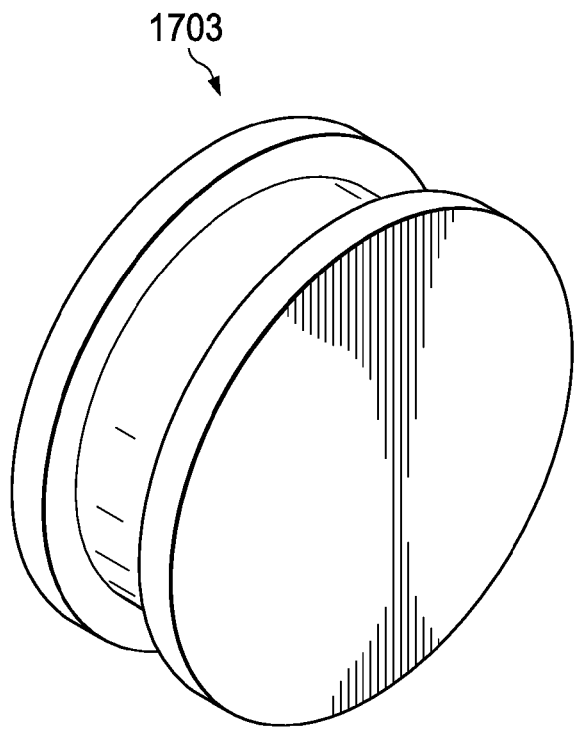
FIGS. 16A and 16B are perspective views of a blank and a sleeve portion, respectively, in accordance with some alternative embodiments of the present disclosure.
Figure 16B:
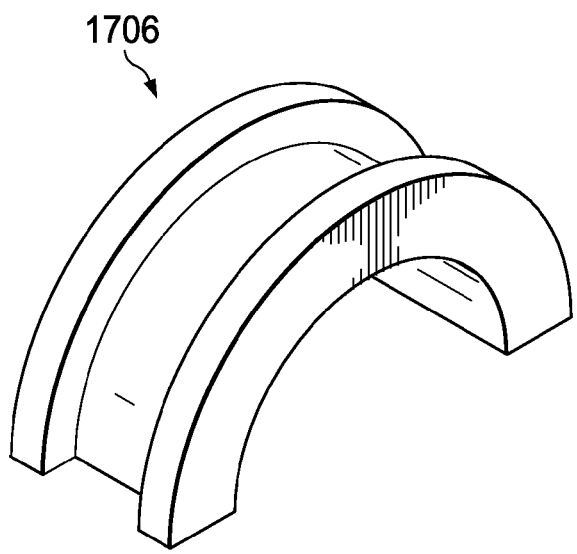
Figure 17:
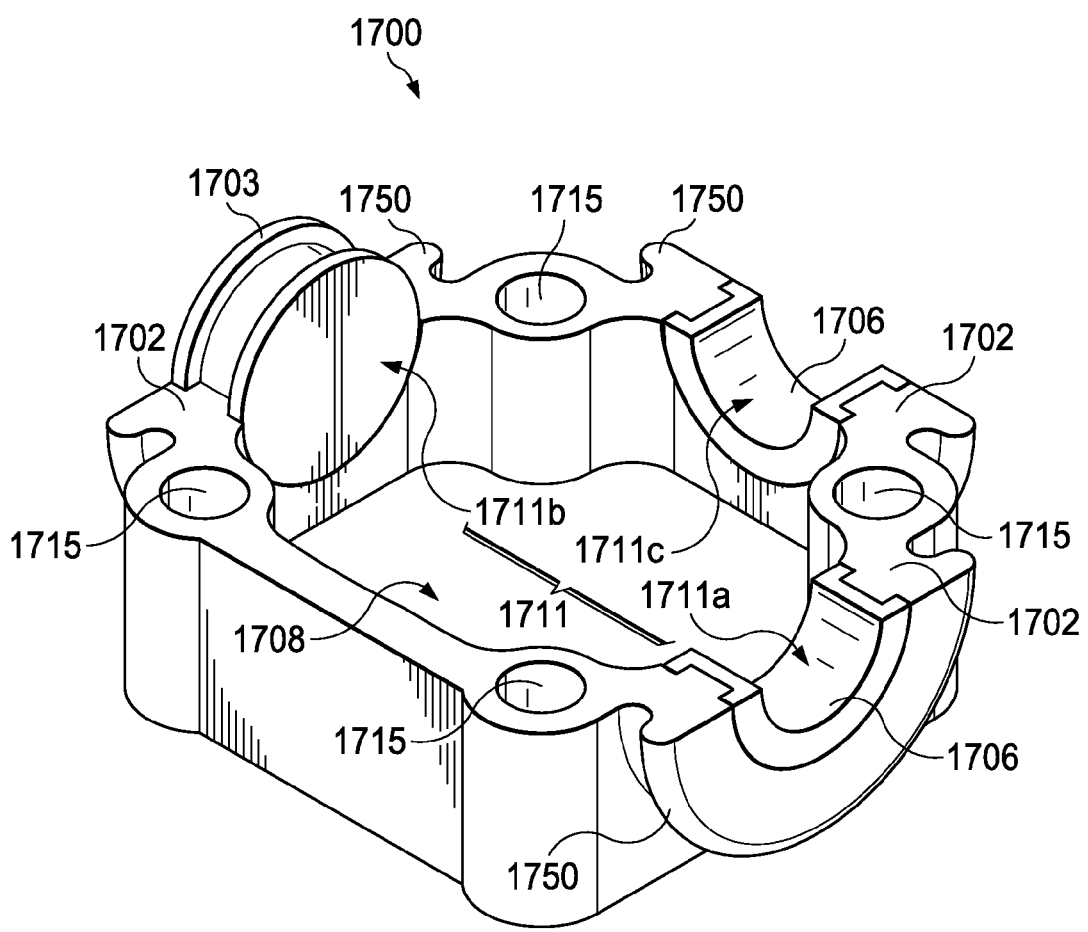
FIG. 17 is a perspective view of an enclosure portion with sleeve portions and a blank inserted therein, in accordance with some alternative embodiments of the present disclosure.

While, as discussed above, blank 1703 helps make the MME versatile so as to be applicable to pipe sections of different types, sleeve portion 1706, shown in FIGS. 15C, 15D, and 16B, helps make the MME versatile so as to be applicable to pipe sections of different sizes (e.g., different diameters). Each of blank 1703 and sleeve portion 1706 fits into recessed portion 1711 of enclosure portion 1700, as shown in FIG. 17. However, while blank 1703 may be at least substantially circular in shape, sleeve portion 1706 may be at least substantially semi-circular in shape. Thus, while a formed enclosure will use only a single blank 1703 to fit into an opening 1712 thereof (if a blank is needed), a formed enclosure will use two opposing sleeve portions 1706 to fit respectively into the two aligned, opposing recessed portions 1711 forming the opening 1712 (if sleeve portions 1706 are needed). Together, the two opposing sleeve portions 1706 fitted into the opening 1712 form a sleeve in opening 1712. The sleeve serves to reduce the inner diameter of opening 1712, so that opening 1712 may accommodate a pipe of smaller diameter (as compared to without the sleeve) while still holding or gripping the pipe appropriately securely in place. The modular pipe repair enclosure system may be provided with sleeve portions 1706 of different sizes (e.g., diameters) so as to accommodate pipe sections of a variety of diameters. For example, the system could include sleeve portions 1706 of two sizes, one for accommodating pipes of ½" diameter, and one for accommodating pipes of ¾" diameter, where the enclosure without sleeves would accommodate pipes of 1" diameter. As another example, the system could include sleeve portions 1706 of for accommodating pipes of 1½" diameter, where the enclosure without sleeves would accommodate pipes of 2" diameter. While these examples are ones that the inventors understand to be practical in certain real world applications, the modular pipe repair enclosure system is in no way limited to such or the like dimensions, or to such or the like ratios of dimensions. Of course, the inclusion of sleeve portions 1706 (sleeves) in the modular pipe repair enclosure system is not required altogether, and even if included, sleeve portions 1706 (sleeves) need not be used in every situation.

Both blank 1703 and sleeve portion 1706 may be designed so as to be connected to enclosure portion 1700 in a mating fashion. For example, as illustrated in FIGS. 16A, 16B and 17, blank 1703, sleeve portion 1706, and recessed portion 1711 of enclosure portion 1700 may be designed to be connected by means of a tongue and groove connection, specifically, a tongue and groove connection between blank 1703 and recessed portion 1711, and a tongue and groove connection between sleeve portion 1706 and recessed portion 1711. While the figures show recessed portion 1711 having the tongue, and blank 1703 and sleeve portion 1706 each having a groove, of course, these assignments of tongue and groove could be altered, e.g. reversed. Moreover, any other type of mating connection, such as would be known to one of ordinary skill in the art, may be employed. The illustrated tongue and groove connection may also be described herein by stating that each of the recessed portions 1711 includes a first lip, and each of the blank 1703 and the sleeve portions 1706 includes two second lips, such that the first lip and the second lips are configured for mating connection therebetween. Again, for example, each of blank 1703 and sleeve portion 1706 could be designed to have a single lip rather than two lips. Further, blank 1703 and sleeve portion 1706 may be connected to recessed portion 1711 by using an adhesive. Adhering blank 1703 and sleeve portion 1706 to respective recessed portions 1711 with an adhesive could be used instead of or in addition to a mating connection such as those described here. Inasmuch as it is possible to form an enclosure without a mating connection, adhesion by adhesive, or the like, the use of the term "connect," "join," or the like, or grammatical variants thereof, is intended to encompass but not to be limited to a secure connection such as may be achieved by a mating, adhesive or stronger connection.

The manufacturing methods described above with reference to FIG. 12, whereby an individual component may be formed from a single piece of solid steel, using computer-aided design and computer-aided manufacturing, apply as well to the above-described components (e.g., enclosure portion 1700, blank 1703, sleeve portion 1706, strongback clamping devices 2360 and 2370) of the above-described alternative embodiments, which are illustrated in FIGS. 14A-23. These components, including all of the above-described features of these components, may be formed according to methods discussed above with reference to FIG. 12.

While alternative embodiments of a modular pipe repair enclosure system using an MME have been described with reference to FIGS. 14A-23, it should be borne in mind that such embodiments are merely exemplary and (as discussed in more detail below) a wide range of variations thereon falling within the subject matter claimed herein will be readily apparent to one or ordinary skill in the art.

For example, while the two enclosure portions 1700 making up an enclosure are illustrated as two identical portions, that is, two enclosure halves, the two enclosure portions 1700 need not be identical halves. Likewise, the two recessed portions 1711 of the two enclosure portions 1700 making up an enclosure are illustrated as identical semi-circular portions, but these two recessed portions 1711 need be neither identical nor semi-circular. Of course, if not semi-circular, an additional component such as an insert similar to the above-described sleeve may be useful or necessary to provide a shape that fits more closely a pipe having a circular cross-section, if the enclosure is to be used with such pipes. Again, if the two recessed portions 1711 are not identical, and one of them forms a larger portion of the circular opening 1712 than the other, it may be useful or necessary to permit the larger recessed portion to be modified (e.g., openable) to a semi-circular shape for insertion of a pipe having a circular cross-section.

While the sleeve was described above as comprising two separate sleeve portions 1706, the sleeve could be a single piece, e.g., comprising a hinged piece made of two sleeve portions connected by a hinge. While blank 1703 was described above as comprising a single circular piece, blank 1703 could be formed from multiple pieces, e.g., two separate semi-circular pieces.

With regard to the connection between the blank 1703 or sleeve/sleeve portion 1706 and the enclosure portions 1700, it would be possible to attach the blank 1703 and sleeve/sleeve portions 1706 not in recessed portions 1711 but on the outside of the side walls of enclosure portions 1700, that is, at an external position like that of first strongback clamping devices 2360, whether by means of lips as used in the case of first strongback clamping devices 2360, by being bolted onto the surface of the side walls, or otherwise.

The orientation of the recessed portions 1711 with respect to one another (that is, at angles of 90 and 180 degrees) could be modified, e.g., to accommodate pipe sections of different types, e.g., a pipe section that is not straight but turns at an angle other than 90 degrees.

The enclosure attachment device could be modified as will be understood by one of ordinary skill in the art.

The strongback clamping unit and any of its components could be modified, either along lines indicated above, where applicable, or otherwise, as will be understood by one of ordinary skill in the art.

The above examples of variations are not to be taken as a comprehensive list of possible variations.

Figure 18:
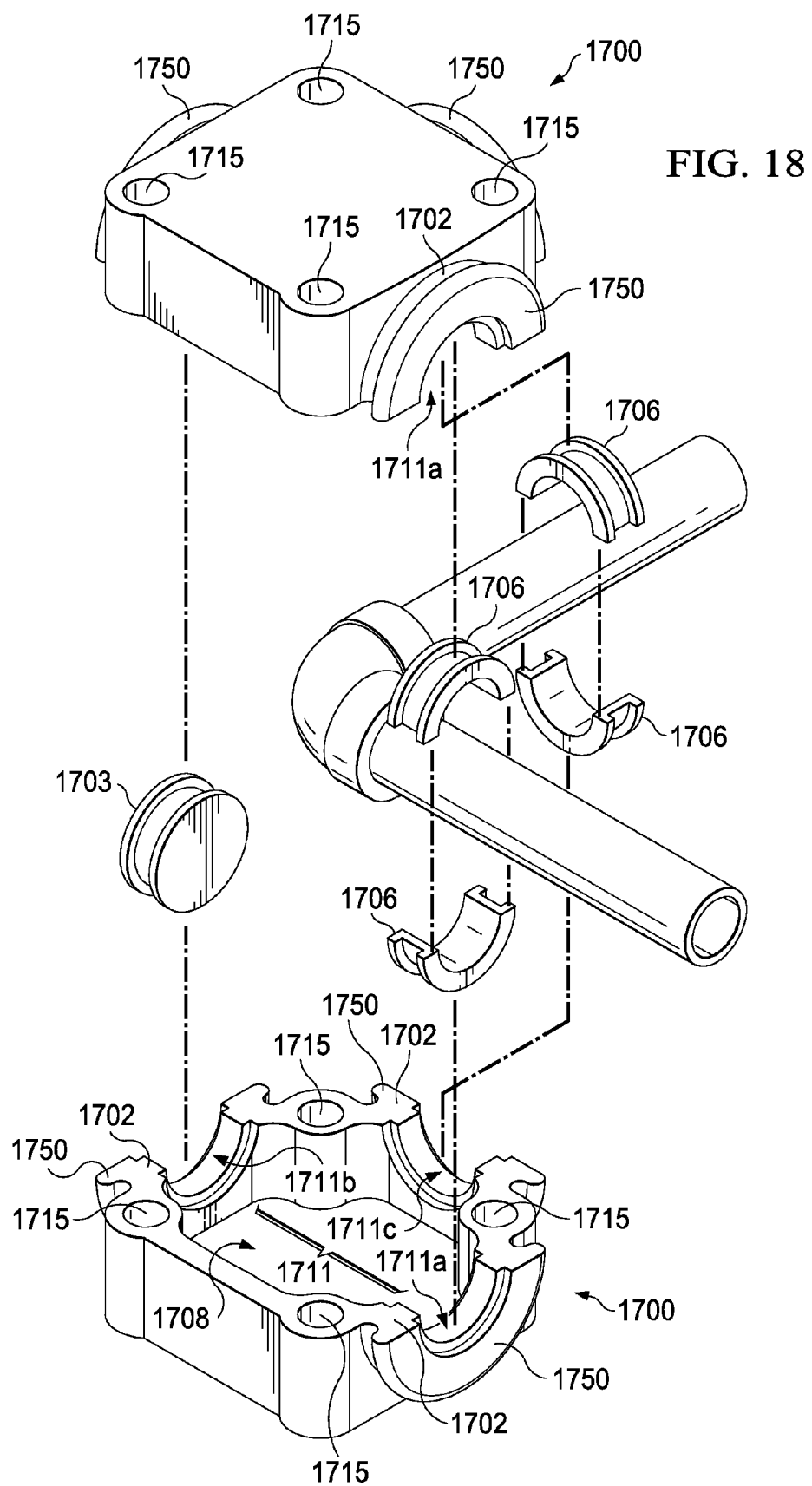
FIG. 18 is view illustrating assembly of an enclosure for repairing a leak in an elbow section of pipe, using sleeve portions and a blank, in accordance with some alternative embodiments of the present disclosure.
Figure 24:
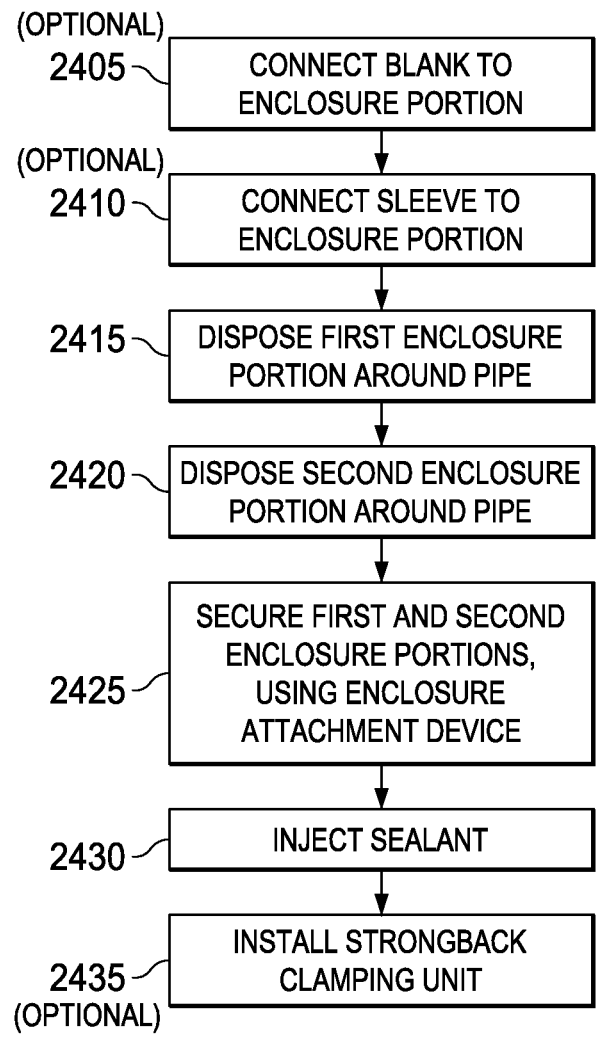
FIG. 24 is a flow chart illustrating installation of a modular pipe repair enclosure to repair pipe leaks, in accordance with some alternative embodiments of the present disclosure.

Methods of using the modular pipe repair enclosure systems having the MME enclosures (as described in the above alternative embodiments with reference to FIGS. 14A-23), will now be described with reference to FIGS. 14A-24 and in particular FIGS. 18 and 24. FIG. 24 is a flow chart of an exemplary such method. These methods may be used to repair one or more leaks in a section of pipe.

According to an exemplary method, two enclosure portions 1700 are joined to form an enclosure around a pipe section. In step 2415, a first enclosure portion is disposed around a pipe. In step 2420, a second enclosure portion is disposed around the pipe, opposed to the first enclosure portion 1700, so as to create an enclosure around the pipe and a void portion, the void portion constituting a void between the enclosure and the pipe, and the enclosure including three openings 1712 (formed by the three aligned pairs of recessed portions 1711 of the enclosure portions 1700, as described above), each of the three openings 1712 being configured to accommodate the enclosed pipe. The void portion may cover one or more leaks in the enclosed pipe. In step 2425, the first and second enclosure portions are attached or secured, using an enclosure attachment device. In step 2430, sealant is injected through an injection point of the first and second enclosure portions into the void portion. As discussed, any suitable sealant may be used. For example, a solid or semi-solid sealant may be used. The sealant may fill the void portion and seal the leak(s) in the enclosed pipe.

The method as described above is suitable for a T-section of pipe of a size (diameter) matching the inner diameter of the openings 1712 of the enclosure. In this case, the three prongs of the T-section will be properly accommodated by the three openings 1712 of the enclosure. However, if the pipe section to be enclosed and repaired is of a different type or size, the method may include additional steps.

If the pipe section to be enclosed and repaired is, e.g., a straight section or an elbow section, a blank 1703 may be installed in the enclosure, as in exemplary step 2405. In optional step 2405, a blank 1703 is connected to at least one of the first and second enclosure portions 1700. As an optional part of step 2405, blank 1703 may be adhered to at least one of the first and second enclosure portions 1700 using an adhesive. Upon formation of the enclosure, the blank 1703 will close one of the openings 1712 of the enclosure. In step 2405, the blank 1703 may be inserted in a third recessed portion 1711c (that is, a recessed portion 1711 that is arranged at an angle of 90 degrees to the first and second recessed portions 1711a and 1711b, as explained above) if the pipe being enclosed and repaired is a straight section, and the blank 1703 may be inserted in a second recessed portion 1711b (that is, a recessed portion 1711 that is arranged at an angle of 180 degrees to the first recessed portion 1711a and an angle of 90 degrees to the third recessed portion 1711c, as explained above) if the pipe being enclosed and repaired is an elbow section. In this way, the pipe to be enclosed will be accommodated by the two remaining openings 1712 of the formed enclosure (one opening 1712 having been closed by the blank 1703), as explained above.

If the pipe section to be enclosed and repaired is of a size (diameter) smaller than the inner diameter of the openings 1712 that would be formed by the completed enclosure, then a sleeve may be installed in the enclosure, as in exemplary step 2410, in order to effectively reduce the inner diameter of openings 1712 so that openings 1712 may properly accommodate (e.g., properly hold and grip) the pipe. In optional step 2410, a sleeve is connected to at least one of the first and second enclosure portions 1700. As an optional part of step 2410, the sleeve may be adhered to at least one of the first and second enclosure portions 1700 using an adhesive. Upon formation of the enclosure, the connected sleeve properly accommodates the enclosed pipe. In step 2410, if the sleeve is made up of two sleeve portions 1706, then sleeve portions 1706 may be inserted in recessed portions 1711 of enclosure portions 1700. Specifically, a sleeve portion 1706 may be inserted in each of two appropriate ones of recessed portions 1711 of each enclosure portion 1700, for the case of a straight section or an elbow section of pipe, or in all three recessed portions 1711 of each enclosure portion 1700, for the case of a T-section of pipe. For the case of the straight or elbow portion, the determination of which two recessed portions 1711 to insert the sleeve portions 1706 therein follows logically from the discussion in the previous paragraph of where the blank 1703 is to be placed in the case of the straight or elbow portion. That is, for a straight portion, a sleeve portion 1706 would be inserted in each of first and second recessed portions 1711a and 1711b of each enclosure portion 1700, and for an elbow portion, a sleeve portion 1706 would be inserted in each of first and third recessed portions 1711a and 1711c of each enclosure portion 1700. If the sleeve is adhered to an enclosure portion 1700 in this step 2410 and the sleeve is made up of two sleeve portions 1706, then at least one of the two sleeve portions 1706 may be adhered to one of the first and second enclosure portions 1700, using an adhesive. In particular, the two sleeve portions 1706 may be adhered to the first and second enclosure portions 1700, respectively, using an adhesive.

As has been explained, as warranted by the situation, the method may include the use of a blank without sleeves, the use of sleeves without a blank, the use of both a blank and sleeves, or the use of neither blank nor sleeves. In this light, steps 2405 and 2410 are referred to as optional. Step 2405 (viz., installing blank 1703) may precede or follow step 2410 (viz., installing sleeve). Steps 2405 and 2410, if included, would be performed prior to step 2420 (viz., disposing second enclosure portion around pipe) and may be performed prior to or after step 2415 (viz., disposing first enclosure portion around pipe).

If a strongback clamping unit 2300 is needed to reinforce the structural integrity of the pipe, the method may further include exemplary step 2435, which is an optional step of the method. In step 2435, strongback clamping unit 2300 is installed on the pipe and the enclosure. As explained above, strongback clamping unit 2300 may include a pair of opposing first strongback clamping devices 2360, which are disposed around the pipe and connected to the enclosure that has already been formed and is in place around the pipe, a pair of opposing second strongback clamping devices 2370, which are disposed around the pipe, and a pair of strongback rods 2390, which are disposed in and retained by strongback holders 2380 of first strongback clamping devices 2360 and second strongback clamping devices 2370. As explained above, the connection of first strongback clamping devices 2360 to the enclosure may be a mating connection, wherein inner lips 2365 of first strongback clamping devices 2360 are respectively matingly connected to outer lips 1750 of enclosure portions 1700. As part of step 2435, a securing device, for example, fasteners such as clamping bolt(s) and nut(s) (not shown), is installed to secure the strongback clamping unit 2300. As noted above, step 2435 can be performed as a process entirely separate (e.g., at a later time) from the rest of the method.

While methods of using the modular pipe repair enclosure systems having the MME enclosures have been described above with reference to FIGS. 14A-24, it should be borne in mind that such method embodiments are merely exemplary and a wide range of variations thereon falling within the subject matter claimed herein will be readily apparent to one or ordinary skill in the art. As a non-limiting example of such variations, the order of certain of the steps of the above-described methods may be varied. As another non-limiting example of such variations, the above-described methods may be modified as warranted to accommodate variations of the system using the MME, such as the variations described above or other variations as will be understood are possible by one of ordinary skill in the art.

According to various illustrative embodiments, a method and system is disclosed for encapsulating a leak in a pipeline component such as a coupling, elbow, center piece, T-piece, valve-piece, squiggly piece, flange enclosure, and so on. The method and system for encapsulating the leak in the pipeline includes injection of sealant in and around the leak to seal it off without taking the pipeline or component out of service. The system includes a modular repair enclosure that permits incorporation of a plurality of unique endplates which allows the modular repair enclosure to be added to at a later date if there is a need because of further deterioration in the pipeline or component. One endplate also allows installation of a safety strongback if the strongback is required to maintain structural integrity of the leaking pipeline. In accordance with some embodiments of the present disclosure, the endplate is a hub clamp, strongback clamping device or other clamping device. To achieve the add-on capability and built in strongback feature, the endplates of the modular repair enclosure include an outer lip and/or an inner lip in various combinations as described herein and as will be appreciated are possible by one of ordinary skill in the art. In accordance with some embodiments of the present disclosure, the endplate includes a sealant groove uniquely designed to provide a continuous seal from one modular repair enclosure to the next modular repair enclosure when injected with sealant through an injection point in the modular repair enclosure.

In accordance with various alternative embodiments of the present disclosure, a single, self-contained, highly portable and highly versatile enclosure system is provided that permits repair of leaks in pipes of a variety of types and a variety of sizes (e.g., diameters). In these embodiments, the capability to add on a strongback feature is also provided.

Manufacturing the components of the modular pipe repair enclosure systems set forth herein is substantially unique as compared with manufacturing of other pipeline repair devices. Previous pipeline repair devices were manufactured using components made from castings or by fabricating separate components and assembling the pipeline repair device by welding, drilling, machining and grinding each component as separate functions. In accordance with some embodiments of the present disclosure, each of the components of a modular repair enclosure is manufactured from a solid piece of 516-grade 70 steel. Manufacturing of the components may be performed by a CNC milling machine controlled by Esprit™ or similar software system.

The modular repair enclosure manufactured from solid pieces of steel has simplified material traceability as the enclosure is manufactured from only one material. Other pipeline repair enclosures require as many as eight material traceable records per enclosure that often have to be hand stamped on each material in the enclosure. Furthermore, the modular repair enclosure made of components each manufactured from a single solid piece of steel has no required welding and, thus, inspection procedures for the end user are greatly simplified as welder's qualifications do not need to be audited, welding procedures do not need to be approved, weld testing such as Nondestructive testing (NDT) or X-ray do not need to be carried out, and there are no dangers of casting flaws.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A modular pipe repair enclosure system for repair of one or more leaks in a pipe, comprising:
   a first enclosure portion;
   a second enclosure portion;
   an enclosure attachment device, for securing the first enclosure portion and the second enclosure portion; and
   a strongback clamping unit, the strongback clamping unit being disposable around the pipe, being configured for connection to the first enclosure portion and/or the second enclosure portion and having a strongback holder configured for holding a strongback rod for enhancing structural integrity of the pipe,
   wherein the first enclosure portion and the second enclosure portion are so configured as to be disposable around a pipe so as to create an enclosure around the pipe and a void portion, the void portion constituting a void between the enclosure and the pipe and being for covering one or more leaks in the pipe, and the enclosure including three openings, each of the three openings being configured to accommodate the enclosed pipe.

2. The modular pipe repair enclosure system of claim 1, further comprising:
   a sleeve, configured for connection to the first enclosure portion and/or the second enclosure portion and for accommodating the enclosed pipe when connected to the first enclosure portion and/or the second enclosure portion.

3. The modular pipe repair enclosure system of claim 1, further comprising:
   a blank, configured for connection to the first enclosure portion and/or the second enclosure portion and for closing one of the openings of the created enclosure when connected to the first enclosure portion and/or the second enclosure portion.

4. The modular pipe repair enclosure system of claim 1, further comprising:
   a sleeve, configured for connection to the first enclosure portion and/or the second enclosure portion and for accommodating the enclosed pipe when connected to the first enclosure portion and/or the second enclosure portion; and
   a blank, configured for connection to the first enclosure portion and/or the second enclosure portion and for closing one of the openings of the created enclosure when connected to the first enclosure portion and/or the second enclosure portion.

5. The modular pipe repair enclosure system of claim 1, wherein, of the three openings, a first opening and a second opening are arranged at an angle of 180 degrees with respect to each other, and a first opening and a third opening are arranged at an angle of 90 degrees with respect to each other, whereby a straight line section of pipe may be accommodated by the first and second openings, an elbow section of pipe may be accommodated by the first and third openings, and a T-section of pipe may be accommodated by the first, second, and third openings.

6. The modular pipe repair enclosure system of claim 1, wherein the first and second enclosure portions collectively include at least one injection point, configured for communication with the void portion and for injecting sealant through the injection point into the void portion.

7. The modular pipe repair enclosure system of claim 1, wherein each of the first and second enclosure portions includes three recessed portions configured such that, when the first and second enclosure portions are disposed around the pipe to create the enclosure around the pipe, the three recessed portions of the first enclosure portion are respectively aligned with the three recessed portions of the second enclosure portion, whereby the created enclosure has three pairs of aligned recessed portions, each pair of aligned recessed portions forming one of the three openings, respectively.

8. The modular pipe repair enclosure system of claim 7, wherein each of the recessed portions is an at least substantially semicircular portion, and each of the openings is at least substantially circular.

9. The modular pipe repair enclosure system of claim 1, wherein the enclosure attachment device comprises a fastener, and wherein each of the first and second enclosure portions is provided with a hole for inserting the fastener therein, for securing the first and second enclosure portions.

10. The modular pipe repair enclosure system of claim 2, wherein each of the first and second enclosure portions is disposable axially along and partially circumferentially around a pipe, and the first and second enclosure portions are collectively disposable circumferentially around a pipe when oriented in opposition to one another, and
wherein the sleeve comprises two opposing sleeve portions, each of the sleeve portions being disposable axially along and partially circumferentially around a pipe, and the two opposing sleeve portions being disposable circumferentially around a pipe.

11. The modular pipe repair enclosure system of claim 4, wherein each of the sleeve and the blank is configured for mating connection to the first enclosure portion and/or the second enclosure portion.

12. The modular pipe repair enclosure system of claim 4, wherein each of the first and second enclosure portions includes three recessed portions configured such that, when the first and second enclosure portions are disposed around the pipe to create the enclosure around the pipe, the three recessed portions of the first enclosure portion are respectively aligned with the three recessed portions of the second enclosure portion, whereby the created enclosure has three pairs of aligned recessed portions, each pair of aligned recessed portions forming one of the three openings, respectively, and
wherein each of the recessed portions includes at least one first lip, and each of the sleeve and the blank includes at least one second lip, wherein each first lip and each second lip are configured for mating connection therebetween, whereby each of the sleeve and the blank may be matingly connected to a respective one of the recessed portions.

13. The modular pipe repair enclosure system of claim 4, wherein the sleeve comprises two opposing sleeve portions, and each of the first and second enclosure portions, the sleeve portions, and the blank is made of a single solid steel piece.

14. A method for repair of one or more leaks in a pipe, using a modular pipe repair enclosure system, the modular pipe repair enclosure system including:
a first enclosure portion;
a second enclosure portion;
an enclosure attachment device, for securing the first enclosure portion and the second enclosure portion;
a strongback clamping unit, the strongback clamping unit being disposable around the pipe, being configured for connection to the first enclosure portion and/or the second enclosure portion and having a strongback holder configured for holding a strongback rod for enhancing structural integrity of the pipe; and
a securing device, for securing the strongback clamping unit,
wherein the first enclosure portion and the second enclosure portion are so configured as to be disposable around a pipe so as to create an enclosure around the pipe and a void portion, the void portion constituting a void between the enclosure and the pipe and being for covering one or more leaks in the pipe, and the enclosure including three openings, each of the three openings being configured to accommodate the enclosed pipe, and
wherein the first and second enclosure portions collectively include at least one injection point, configured for communication with the void portion and for injecting sealant through the injection point into the void portion, and
the method comprising:
disposing a first enclosure portion around a pipe;
disposing a second enclosure portion around the pipe, so as to create an enclosure around the pipe and a void portion, the void portion constituting a void between the enclosure and the pipe, and the enclosure including three openings each configured to accommodate the enclosed pipe;
securing the first and second enclosure portions, using an enclosure attachment device;
injecting sealant through an injection point of the first and second enclosure portions into the void portion;
connecting a strongback clamping unit to the first and second enclosure portions;
installing a strongback rod in a strongback holder of the strongback clamping unit; and
securing the strongback clamping unit, using a securing device,
wherein the void portion covers a leak in the pipe.

15. The method of claim 14,
wherein the modular pipe repair enclosure system further includes:
a sleeve, configured for connection to the first enclosure portion and/or the second enclosure portion and for accommodating the enclosed pipe when connected to the first enclosure portion and/or the second enclosure portion, and
wherein the method further comprises:
connecting a sleeve to at least one of the first and second enclosure portions;
whereby the connected sleeve accommodates the enclosed pipe.

16. The method of claim 14,
wherein the modular pipe repair enclosure system further includes:
a blank, configured for connection to the first enclosure portion and/or the second enclosure portion and for closing one of the openings of the created enclosure when connected to the first enclosure portion and/or the second enclosure portion, and
wherein the method further comprises:
connecting a blank to at least one of the first and second enclosure portions,
whereby the blank closes one of the openings of the created enclosure.

17. The method of claim 14,
wherein the modular pipe repair enclosure system further includes:
a sleeve, configured for connection to the first enclosure portion and/or the second enclosure portion and for accommodating the enclosed pipe when connected to the first enclosure portion and/or the second enclosure portion; and
a blank, configured for connection to the first enclosure portion and/or the second enclosure portion and for closing one of the openings of the created enclosure when connected to the first enclosure portion and/or the second enclosure portion, and
wherein the method further comprises:
connecting a sleeve to at least one of the first and second enclosure portions, whereby the connected sleeve accommodates the enclosed pipe; and connecting a blank to at least one of the first and second enclosure portions, whereby the blank closes one of the openings of the created enclosure.

18. The method of claim 17, further comprising:
adhering at least one of the sleeve and the blank to at least one of the first and second enclosure portions, using an adhesive.

19. The method of claim 16,
wherein, in the modular pipe repair enclosure system, of the three openings, a first opening and a second opening are arranged at an angle of 180 degrees with respect to each other, whereby a straight line section of pipe may be accommodated by the first and second openings, and
wherein, in the method, the pipe is a straight line section of pipe, and the disposing of the first and second enclosure portions around the pipe and the connecting of the blank are collectively performed such that the first and second openings accommodate the straight line section of pipe, and the blank closes the third opening of the created enclosure.

20. The method of claim 16,
wherein, in the modular pipe repair enclosure system, of the three openings, a first opening and a third opening are arranged at an angle of 90 degrees with respect to each other, whereby an elbow section of pipe may be accommodated by the first and third openings, and
wherein, in the method, the pipe is an elbow section of pipe, and the disposing of the first and second enclosure portions around the pipe and the connecting of the blank are collectively preformed such that the first and third openings accommodate the elbow section of pipe, and the blank closes the second opening of the created enclosure.

21. The method of claim 14,
wherein, in the modular pipe repair enclosure system, of the three openings, a first opening and a second opening are arranged at an angle of 180 degrees with respect to each other, and a first opening and a third opening are arranged at an angle of 90 degrees with respect to each other, whereby a T-section of pipe may be accommodated by the first, second, and third openings, and
wherein, in the method, the pipe is a T-section of pipe, and the disposing of the first and second enclosure portions around the pipe collectively comprise disposing the first and second enclosure portions such that the first, second and third openings accommodate the T-section of pipe.

22. The method of claim 14, wherein the sealant is a solid or semi-solid sealant.

* * * * *